US012009668B1

United States Patent
Wang et al.

(10) Patent No.: US 12,009,668 B1
(45) Date of Patent: Jun. 11, 2024

(54) SYSTEM AND METHOD FOR CONTROLLING GENERATORS BASED ON THE PROCURED CAPACITIES IN RESPONSE TO POWER DISTURBANCE

(71) Applicant: NORTH CHINA ELECTRIC POWER UNIVERSITY, Beijing (CN)

(72) Inventors: Cheng Wang, Beijing (CN); Tianshu Bi, Beijing (CN); Guoyi Xu, Beijing (CN); Muqing Yang, Beijing (CN); Chenyu Ge, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 18/535,341

(22) Filed: Dec. 11, 2023

Related U.S. Application Data

(63) Continuation of application No. 18/141,712, filed on May 1, 2023, now Pat. No. 11,888,323.

(51) Int. Cl.
*H02J 3/38* (2006.01)
*G05B 17/02* (2006.01)
*H02J 3/00* (2006.01)

(52) U.S. Cl.
CPC .............. *H02J 3/381* (2013.01); *G05B 17/02* (2013.01); *H02J 3/0012* (2020.01)

(58) Field of Classification Search
CPC .......... H02J 3/381; H02J 3/0012; G05B 17/02
See application file for complete search history.

(56) References Cited

U.S. PATENT DOCUMENTS 9,762,060 B2 * 9/2017 Kalsi .................... H02J 3/00

* cited by examiner

*Primary Examiner* — Charles Cai

(74) *Attorney, Agent, or Firm* — Hunton Andrews Kurth LLP

(57) ABSTRACT

A method for primary frequency regulation (PFR)reserve procurement of a renewable energy power system is provided. The renewable energy power system includes synchronous power sources and renewable energy sources, and the renewable energy sources participate in frequency regulation using virtual synchronous machine (VSM) control. The method includes: aggregating generators in the synchronous power sources and renewable energy sources into an equivalent unit having an equivalent governor; based on the equivalent unit, determining system frequency dynamics of the renewable energy power system in a s-domain; transforming the s-domain to a time-domain equation for the system frequency dynamics in both over-damped and under-damped states; according to a first-order optimality condition of the time-domain equation, determining a time domain expression of frequency extremum; stabilizing system frequency of the renewable energy power system by adding a hyperplane based frequency stability constraint; and determining the PFR reserve procurement of the renewable energy power system.

1 Claim, 17 Drawing Sheets

SYSTEM AND METHOD FOR CONTROLLING GENERATORS BASED ON THE PROCURED CAPACITIES IN RESPONSE TO POWER DISTURBANCE

FIELD OF THE INVENTION

The present disclosure relates generally to renewable energy power system, and more particularly, to systems and methods of primary frequency reserve procurement of power systems considering multiple damping states and governor limiters.

BACKGROUND

The increasing proportion of renewable energy is one of the main features of the 21st-century power grid. At the same time, the increasing capacity of ultra-high voltage (UHV) alternating current (AC) and direct current (DC) transmission not only makes the frequency characteristics of the power system change in nature, but also significantly increases the risk of frequency disturbance, leading to a reduction in frequency stability after disturbance. In 2015, a bipolar lockout occurred in Jinsu DC of Jiangsu province power grid in China, and the unbalanced power of 3.55% made the frequency of the grid drop to 49.56 Hz.

Primary frequency regulation (PFR) is an important means of power system to suppress frequency changes after disturbance, and its frequency regulation capability depends on adjustable parameters such as governor's droop coefficient, limiter, deadband and various time constants inherent in the governor. Power supply PFR adjustable parameters range and dynamic performance indicators are defined for existing technologies, but for the renewable power system, the reasonableness of the PFR adjustable parameters (especially the governor limiter) is still an open issue.

SUMMARY

Aspects of the disclosed technology include systems and methods of primary frequency reserve procurement of power systems considering multiple damping states and governor limiters.

Embodiments of the present disclosure provide a method for primary frequency regulation (PFR) reserve procurement of a renewable energy power system. The renewable energy power system includes synchronous power sources and renewable energy sources, and the renewable energy sources participate in frequency regulation using virtual synchronous machine (VSM) control. The method can include: aggregating generators in the synchronous power sources and renewable energy sources into an equivalent unit having an equivalent governor, wherein a governor limiter of the equivalent governor is determined; based on the equivalent unit, determining system frequency dynamics of the renewable energy power system in a s-domain; transforming the s-domain to a time-domain equation for the system frequency dynamics of the renewable energy power system in both over-damped and under-damped states; according to a first-order optimality condition of the time-domain equation, determining a time domain expression of frequency extremum; stabilizing system frequency of the renewable energy power system by adding a hyperplane based frequency stability constraint, wherein the frequency stability constraint includes frequency extrema of the renewable energy power system after a disturbance occurs to the renewable energy power system, and the frequency extrema are determined by the time-domain equation; and determining the PFR reserve procurement of the renewable energy power system.

Further features of the disclosed systems and methods, and the advantages offered thereby, are explained in greater detail hereinafter with reference to specific example embodiments illustrated in the accompanying drawings

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
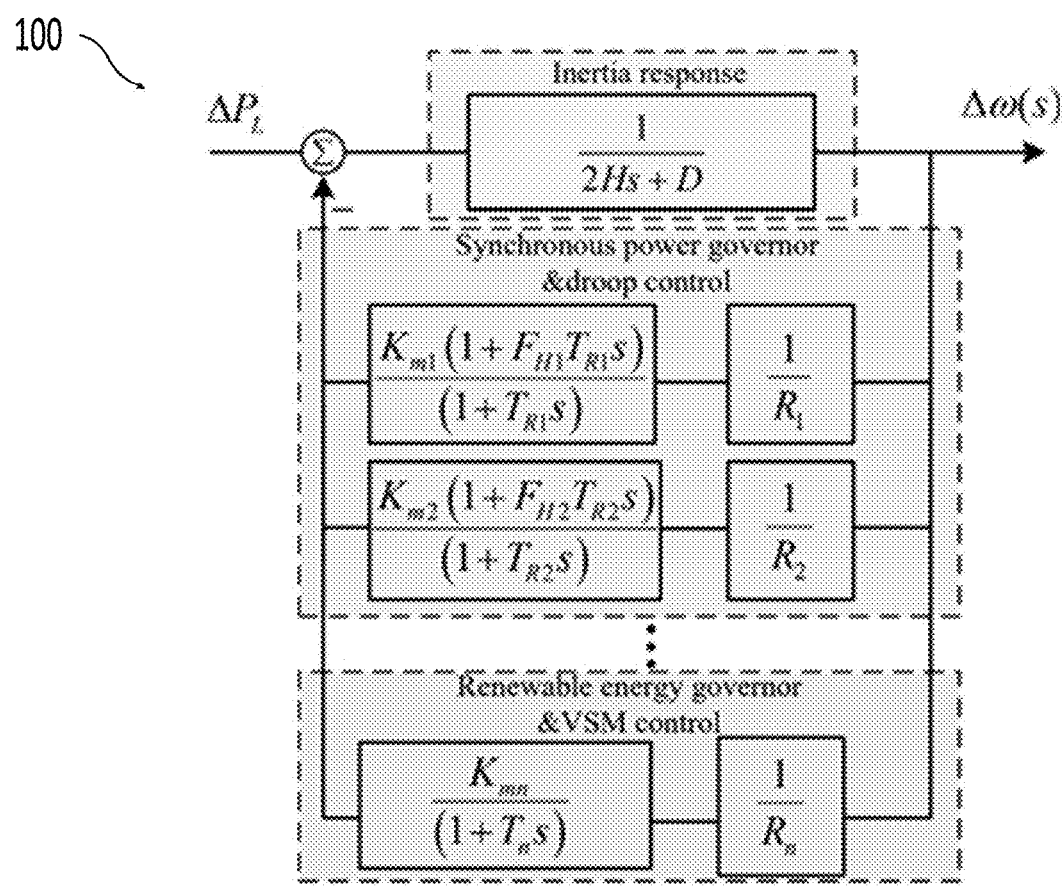
FIG. 1 illustrates a diagram of a frequency response s-domain model of renewable energy power system after disturbance according to an embodiment of the present disclosure.

Exemplary embodiments of the invention will now be described in order to illustrate various features of the invention. The embodiments described herein are not intended to be limiting as to the scope of the invention, but rather are intended to provide examples of the components, use, and operation of the invention. The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Nomenclature

A. Indices and Sets $t \in T$ Time periods.

n Nodes in the power transmission network.

$l \in N_L$ Transmission line.

$g \in N_G$ Thermal genemtor.

$w \in N_W$ Wind farm.

$pv \in N_W$ Photovoltaic station.

j Evaluation points.

$i \in v$ Hyperplane in approximation method.

$g \in S_n^G$ Thermal genemtor at node n.

$w \in S_n^W$ Wind farm at node n.

$pv \in S_n^{PV}$ Photovoltaic station at node n.

$l \in S_n^{LS}$ Transmission lines starting from node n.

$l \in S_n^{Ls}$ Transmission lines ending at node n.

B. Parameters $H_g$ Inertia time constant of generator g [s]

$R_g$ Droop coefficient of generator g [p.u.].

$\Delta P_L$ Active power disturbance [MW].

$T_{Rg}$ Reheat time constant of generator g [p.u.].

$K_{mg}$ Standardized parameter of generator g [p.u.].

$F_{Hg}$ Fraction of total power generated by the high press turbine of generator g [p.u.].

$D_{n,t}$ Electrical load demands at node n [MW].

B Nodal admittance matrix of the power transmission network [S].

$C_g^{Da}$ Day-ahead price offer of generator g [S/MWh].

$c_g^{Res}$ Reserve price offer of generator g [S/MWh].

$P_g^{DG,Max}$ Maximum outputs of generator g [MW].

$P_g^{DG,min}$ Minimum outputs of generator g [MW].

$P_w^{W,Max}$ Maximum outputs of wind farm w [MW].

$P_{pv}^{PV,Max}$ Maximum outputs of photovoltaic station pv [MW].

$\omega_{max}/\omega_{min}$ Maximum/minimum frequency of system max [Hz].

$a_i/b_i/c_i/d_i$ Coefficient of hyperplanes in approximation method [p.u.].

C. Variables $\theta_{n,t}$ Day-ahead voltage angle at node n [rad].

$P_{g,t}^G$ Day-ahead dispatch of generator g [MW].

$P_{w,t}^W$ Day-ahead dispatch of wind farm w [MW].

$P_{pv,t}^{PV}$ Day-ahead dispatch of photovoltaic station pv [MW].

$\Delta P_{max,g,t}^{G,up}$ Up reserve deployment of generator g [MW].

$\Delta P_{max,g,t}^{G,down}$ Downward reserve deployment of generator g [MW].

$\Delta P_{max,w,t}^{W,up}$ Up reserve deployment of wind farm w [MW].

$\Delta P_{max,w,t}^{W,down}$ Downward reserve deployment of wind farm w [MW].

$\Delta P_{max,pv,t}^{PV,up}$ Downward reserve deployment of wind farm w [MW].

$\Delta P_{max,pv,t}^{PV,down}$ Up reserve deployment of photovoltaic station w [MW].

$\Delta P_{max,pv,t}^{PV,down}$ Downward reserve deployment of photovoltaic station w [MW].

$P_{pv,t}^{PV}$ Downward reserve deployment of photovoltaic station w [MW].

I. Introduction

With the proportion of renewable energy power access, energy storage capacity continues to increase, PFR has become a paid auxiliary service. Fast frequency regulation (FFR) is available for various power sources in the electricity markets of the United States, Europe, Australia and other countries, the power system can be reasonably procured of FFR according to the operation to ensure the system frequency stability. Therefore, how to reasonably settle the PFR reserve capacity of renewable energy power system has also become a research hotspot.

At present, the research work on the PFR reserve procurement of renewable energy power systems can be divided into two categories: first, to build an analytical model of the system frequency response taking into account the PFR reserve capacity (i.e., the governor limiter); second, to build an analytical relationship between the frequency extremum point and the PFR reserve capacity in the time domain after the disturbance, and to embed it into the power system reserve procurement time-domain optimization model.

For the first type of work, it can be subdivided into two categories according to the fineness of the spatial distribution of the system frequency: (i) system frequency response (SFR) and its improved version based on the assumption of system frequency homogenization; (ii) electromechanical transient approximation with multimachine swing (ETA-MS).

In order to reduce the cost of frequency dynamic resolution after disturbance, the SFR model and average system frequency response (ASFR) model were proposed in existing technologies, respectively, which ignore governor limiter, system topology and operating point. In an existing technology, based on the ASFR model, multiple synchronous power governor parameters aggregation method was proposed, but the governor limiter is not considered. In an existing technology, a SFR model of renewable energy power system based on virtual synchronous machine (VSM) control is established, and the renewable energy PFR time constant is set to be the same as that of thermal generators, while the governors of all power supplies are assumed to work in the linear state, and the PFR reserve procurement is more conservative. Under the condition that the PFR reserve capacity of each power source is known, the SFR model of renewable energy power system with the governor limiter is established in an existing technology, and the dynamic segmentation resolution of renewable energy power system frequency is realized, however, the model cannot predict the time when each governor enters the governor limiter, and the analytical relationship between the reserve capacity and the frequency extremum point after the disturbance is not established, it cannot be applied to the optimal PFR reserve procurement problem.

Based on the ETS-MS model, the related research is highly consistent, i.e., based on the finite difference method, the time step is chosen to establish an approximate time domain model of the power system dynamics at the electromechanical transient scale, taking into account the governor time constants, limiter and deadzone, while accounting for power flow shift caused by multi-machine sway. It should be noted that such models not only contain non-linear links such as the governor deadzone and limiter, but also contain non-linear power flow equations with high solution costs. It is difficult to coordinate the frequency dynamic resolution accuracy with the system scale, and it is generally applied to the frequency dynamic resolution of small and medium-scale power systems, such as regional grids or microgrids.

It should be noted that the technical route for constructing the time-domain solution relationship between the frequency extremum point and the PFR reserve is directly related to the analytical model of the system frequency response. If the system frequency response is inscribed by SFR model and its improved type, the segmented linearization method can be used to approximate the time-domain nonlinear expression of the frequency extremum point and the PFR reserve as a set of hyperplanes. If the ETA-MS model is used, additional 0-1 variables need to be introduced to linearize the deadzone, limiter and other non-linear aspects of the governor, so as to obtain a linear relationship between the frequency extremum point and the PFR reserve. In particular, a two-stage approach has been proposed to settle the PFR reserve in an existing technology, i.e., to construct the main problem of PFR reserve procurement with a frequency extremum point check subproblem, and if the subproblem is solved with the frequency extremum point exceeding the threshold, the parameters affecting the frequency extremum point are adjusted with a given step, and if there are many types of PFR parameters and a large number of devices involved in the PFR, it is easy to fall into local optimum and combinatorial explosion. As in an existing technology, the frequency extremum point is associated with five PFR parameters, and only one device has 25 PFR parameter adjustment schemes in a single adjustment process.

In addition, the PFR characteristics of renewable energy sources are significantly different from those of traditional synchronous power sources. In power systems dominated by conventional synchronous power sources, the frequency response is generally under-damped, while the system frequency response may become over-damped when renewable energy sources are involved in frequency regulation. The expressions of frequency extremum point in different damped states (over-damped and under-damped) were analyzed in existing technologies using a categorical discussion. However, the damping ratio of the system frequency response is closely related to the system equivalent PFR parameters, and the system equivalent PFR parameters change implicitly with the PFR reserve procurement. Therefore, it is necessary to construct a system frequency response model suitable for multiple damping states to facilitate the uniform optimal PFR reserve procurement in the over-damped and under-damped states of the system frequency response.

As described above, primary frequency regulation (PFR) is an essential means for the power system to suppress frequency change after disturbance. The present disclosure discloses the primary frequency regulation reserve settling of the renewable energy power system. Firstly, the rising penetration rate of renewable energy power supply on the damping ratio of the system frequency response model is analyzed, and a system frequency response model applicable to multiple damping states is established. Then, considering the fast dynamic response of renewable energy power frequency regulation and the difference in synchronous power governor limiter value, the system frequency response improvement model is disclosed to consider the multi-machine governor limiters. Then, the constructed system frequency response improvement model is equivalently transformed into the time domain. The time-domain analytical relationship between the primary frequency regulation reserve and the post-disturbance frequency extremum point of various power supplies is established, and its linearization characterization method is further disclosed. Finally, for the frequency stability requirement after disturbance, the primary frequency regulation reserve constraint is added to the new energy power system's economic dispatch, and the renewable energy power system's primary frequency regulation reserve settling model is established. Simulation results of an IEEE 39-bus system show the correctness and effectiveness of the disclosed model in the present disclosure.

II. Frequency Dynamic Analysis Model of Renewable Energy Power System

The renewable energy power system in the present disclosure contains synchronous power sources such as thermal power and hydro power, as well as renewable energy sources such as wind turbines and photovoltaics on the power side, where the renewable energy sources are involved in frequency regulation using VSM control; the grid structure is a regional AC grid; the load type connected to the system is assumed to be a constant power load, which is not involved in frequency regulation.

A. Analytical Model of System Frequency Dynamics Considering Multiple Damping States FIG. 1 illustrates a diagram 100 of a frequency response s-domain model of renewable energy power system after disturbance according to an embodiment of the present disclosure. If the spatial distribution of frequency is not considered, the s-domain model of the system frequency dynamics of the renewable energy power system after disturbance can be approximated by the diagram 100 shown in FIG. 1. In FIG. 1, H is the system equivalent inertia time constant; R is the droop coefficient; $\Delta P_L$ is the active power disturbance; $T_R$ is the reheat time constant; $K_m$ is the mechanical power gain factor; $F_H$ is the fraction of total power generated by the high press turbine. It should be noted that this model only includes the inertial response of the system and the PFR, and does not take into account the effect of the secondary frequency regulation on the frequency dynamics.

Based on the SFR model framework, all generators are aggregated into one equivalent unit, and the inertia H, droop coefficient R, fraction of total power generated by the high press turbine $F_H$ and reheat time constant $T_R$ of the equivalent unit are aggregated as follows.

$$H = \sum_{g=1}^{n} H_g K_{mg} \quad (1)$$

$$\frac{1}{R} = \sum_{g=1}^{n} \frac{K_{mg}}{R_g} \quad (2)$$

$$\lambda_g = \frac{K_{mg}}{R_g \sum_{g=1}^{n} (K_{mg}/R_g)} \quad (3)$$

$$F_H = \sum_{g=1}^{n} F_{Hg} \lambda_g \quad (4)$$

$$T_r = \sum_{g=1}^{n} T_{Rg} \lambda_g \quad (5)$$

Where $K_{mg} = S_g/S_{sys}$, $K_{mg}$ is the standardized parameter of the unit normalized to the system capacity; $\lambda$ is an intermediate variable for writing convenience.

Figure 2:
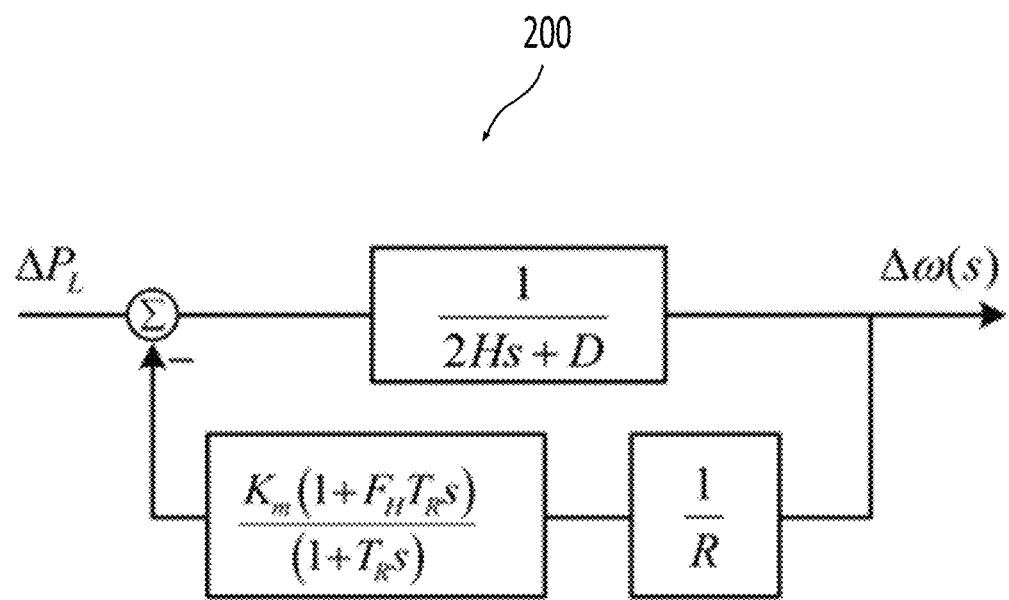
FIG. 2 illustrates a diagram of a multi-machine aggregation system frequency dynamic model according to an embodiment of the present disclosure.

FIG. 2 illustrates a diagram 200 of a multi-machine aggregation system frequency dynamic model according to an embodiment of the present disclosure. Further, the frequency dynamic s-domain model of the system after disturbance can be simplified to the form as shown in the diagram 200 of FIG. 2, where the renewable energy supply with VSM control can be regarded as a synchronous supply with zero $F_H$.

Based on FIG. 2, the system frequency dynamic s-domain expression can be shown below:

$$\Delta \omega(s) = \left( \frac{R\omega_n^2}{DR + K_m} \right) \left( \frac{(1 + T_R s)\Delta P_L}{s(s^2 + 2\xi\omega_n s + \omega_n^2)} \right) \quad (6)$$

Where the natural frequency w and damping ratio in the equation (6) are:

$$\omega_n = \sqrt{\frac{DR + 1}{2HRT_R}} \quad (7)$$

$$\zeta = \frac{DRT_R + 2HR + F_H T_R}{2(DR + 1)} \omega_n \quad (8)$$

Converting the equation (6) to the time-domain for the frequency dynamics of the inertia center frequency can be done as follows:
Where:

$$\Delta\omega(t) = \frac{R\Delta P}{DR + 1} \left[ 1 + \alpha e^{-\zeta\omega_n t} \sin(\omega_r t + \varphi) \right] \quad (9)$$

$$\omega_r = \omega_n \sqrt{1 - \zeta^2} \quad (10)$$

$$\alpha = \sqrt{\frac{1 - 2T_R\zeta\omega_n + T_R^2\omega_R^2}{1 - \zeta^2}} \quad (11)$$

$$\phi = \arctan\left(\frac{\omega_r T_R}{1 - \zeta\omega_n T_R}\right) - \arctan\left(\frac{\sqrt{1 - \zeta^2}}{-\zeta}\right) \quad (12)$$

Figure 3:
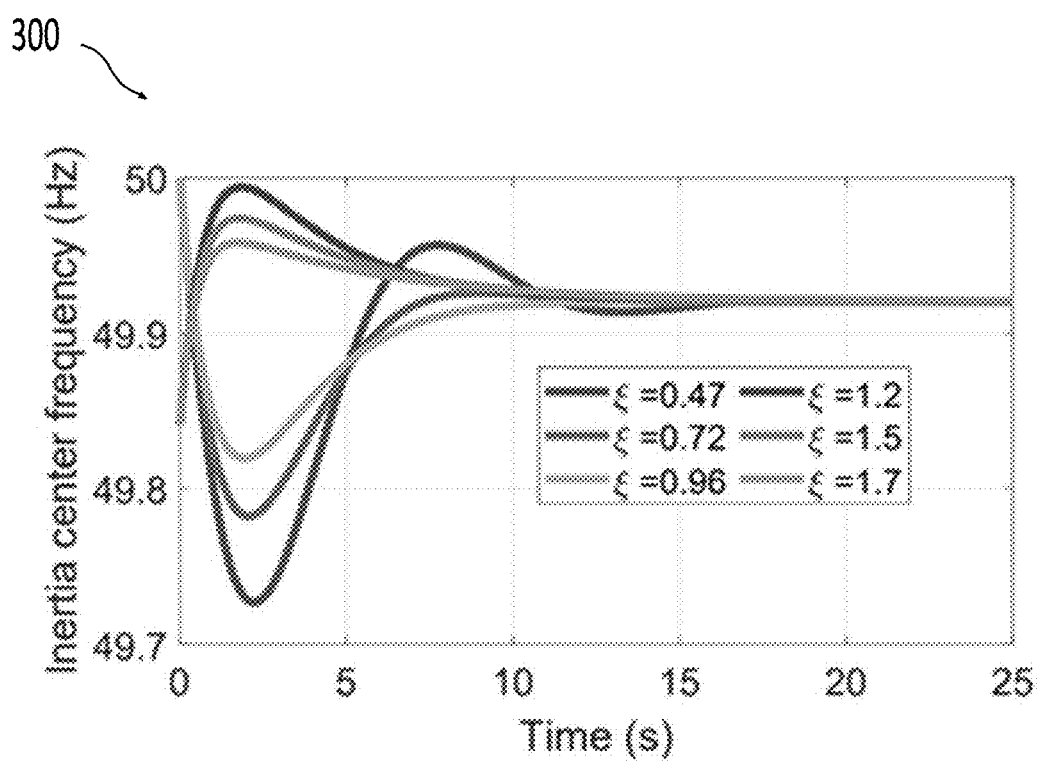
FIG. 3 illustrates a diagram of calculation error of a system frequency response (SFR) model frequency dynamics in an over-damped condition according to an embodiment of the present disclosure.

FIG. 3 illustrates a diagram 300 of calculation error of a system frequency response (SFR) model frequency dynamics in an over-damped condition according to an embodiment of the present disclosure. It should be noted that the equation (9) is only applicable to portray the system frequency dynamics in the under-damped state; in the over-damped state, the equation (9) has a large calculation error as shown in the diagram 300 in FIG. 3.

Figure 4:
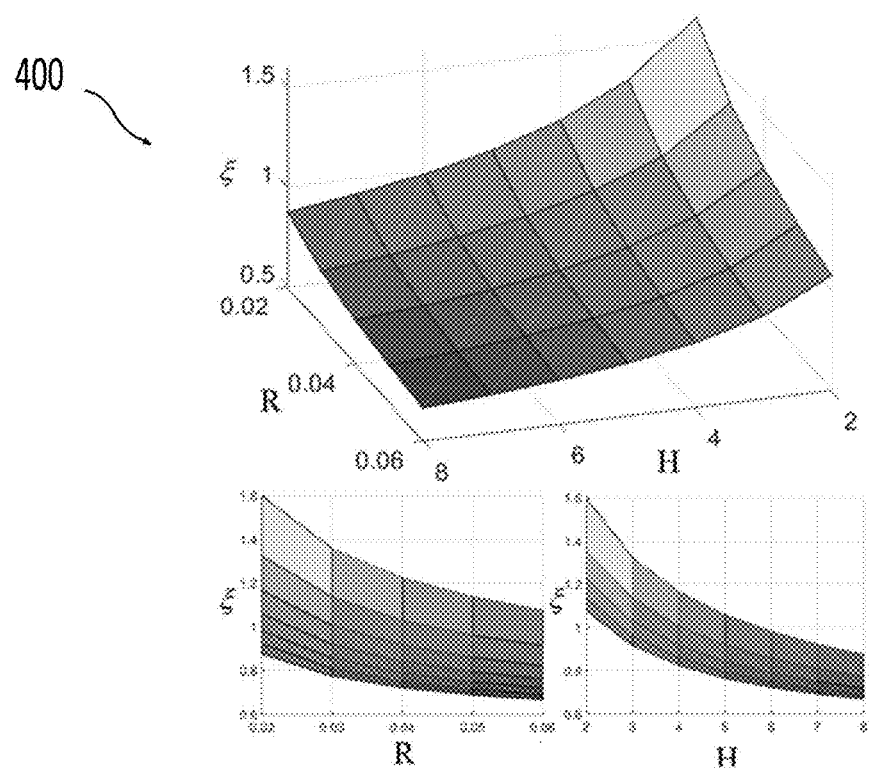
FIG. 4 shows a diagram of system frequency dynamic damping ratio as a function of inertia and droop coefficient according to an embodiment of the present disclosure.

FIG. 4 shows a diagram 400 of system frequency dynamic damping ratio as a function of inertia and droop coefficient according to an embodiment of the present disclosure. From the equation (8), it can be seen that the damping ratio is closely related to the system inertia time constant H and the droop coefficient R as shown in the diagram 400 in FIG. 4.

For this reason, the time-domain expression of the system frequency dynamics after the disturbance applicable to the multiple damping states is derived in the present disclosure:
Where:

$$\Delta\omega(t) = \frac{R\Delta P_L}{K_m + RD}(1 - A_1 e^{\omega_1 t} - A_2 e^{\omega_2 t}) \quad (13)$$

$$\omega_1 = \omega_n \left(-\xi + \sqrt{\xi^2 - 1}\right) \quad (14)$$

$$\omega_2 = \omega_n \left(-\xi - \sqrt{\xi^2 - 1}\right) \quad (15)$$

$$A_1 = \frac{\sqrt{\xi^2 - 1} + \xi - T_R \omega_n}{\sqrt{\xi^2 - 1}} \quad (16)$$

$$A_2 = \frac{\sqrt{\xi^2 - 1} - \xi + T_R \omega_n}{\sqrt{\xi^2 - 1}} \quad (17)$$

It should be noted that when the damping ratio is less than 1, the parameters characterized by the equations (16)-(17) will have imaginary parts; however, if they are substituted into the equation (13), the imaginary parts of the parameters will cancel each other out, ensuring that the frequency dynamic time-domain expressions still belong to the real number space.

B. Frequency Dynamic Analysis Model of System Considering Governor Limiters

Figure 5:
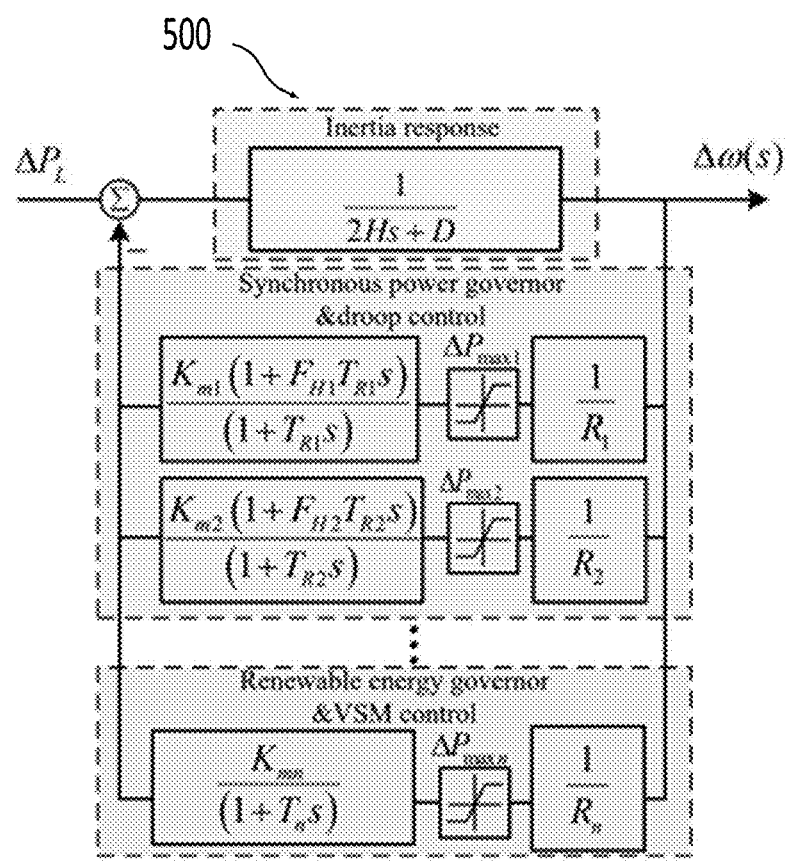
FIG. 5 shows a diagram of a frequency response s-domain model of renewable energy power system considering the governor limiters according to an embodiment of the present disclosure.

FIG. 5 shows a diagram 500 of a frequency response s-domain model of renewable energy power system considering the governor limiters according to an embodiment of the present disclosure. Considering the PFR governor limiters, the s-domain model of the system frequency dynamics after the disturbance of the renewable energy power system can be approximated by the diagram 500 in FIG. 5.

If the governor limiter value is known, the order of each power governor into the limit can be deduced according to the limit value and the regulation rate, and further by the method of segmental analysis and response superposition to obtain the system frequency dynamics analytical formula after the disturbance. However, in the PFR reserve procurement problem, the governor limit value is the optimization variable, which is an unknown quantity, so it is impossible to determine the order of each power governor into the limit, and it is also impossible to obtain the dynamic analytic formula of the system frequency after the disturbance.

Figure 6:
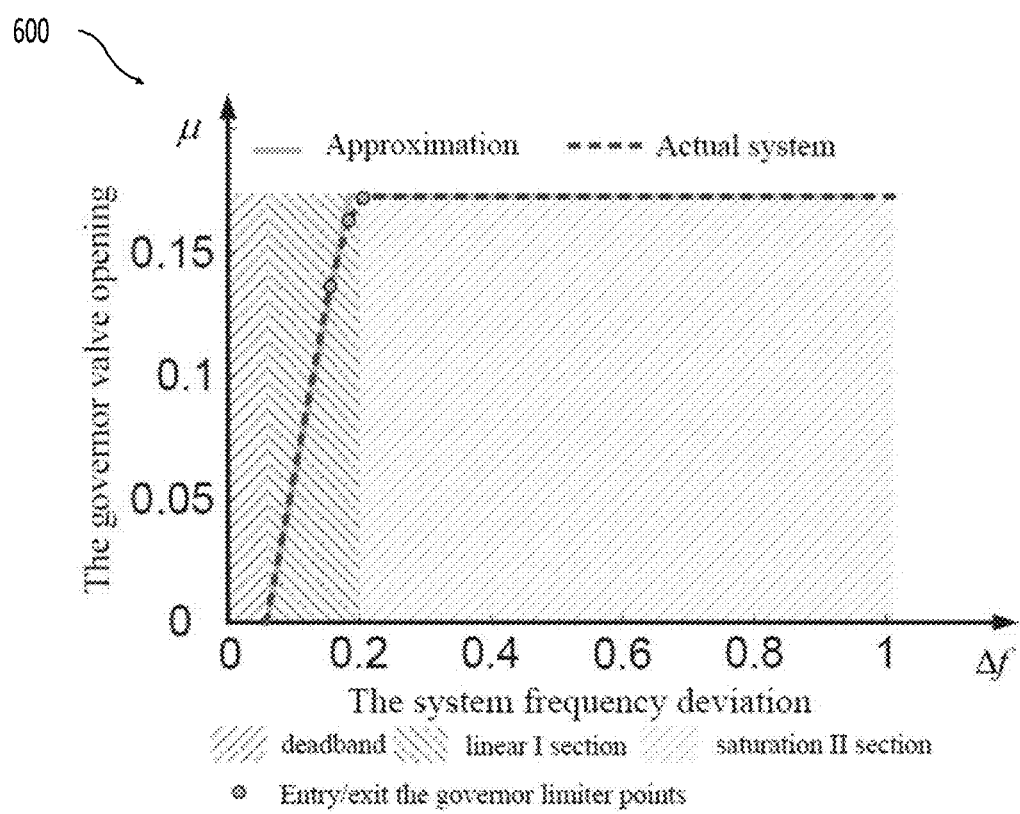
FIG. 6 shows a diagram of system frequency deviation versus equivalent governor valve opening curve according to an embodiment of the present disclosure.

As shown in FIG. 5, the governor limiting link in the governor before the prime mover, taking into account the synchronous power unit reheat time constant is often large, so two linear functions can be used to approximate the synchronous power governor sequential into limiting this phenomenon as shown in FIG. 6. FIG. 6 shows a diagram 600 of system frequency deviation versus equivalent governor valve opening curve according to an embodiment of the present disclosure. In the diagram 600 in FIG. 6, the horizontal axis is for the system frequency deviation, the vertical axis is for the governor valve opening, and the two linear functions are recorded as linear I section and saturation II section. In the linear I section, the system equivalent governor does not enter the limit, while ignoring the impact of the governor deadband on the frequency dynamics; while in the saturation II section, the system equivalent governor into the limit, linear I section and saturation II section of the segment point coordinates can be obtained from the system equivalent frequency parameters.

Considering the each power governor limiter, the system equivalent PFR parameters are aggregated as follows, where the reserve capacity of the equivalent power supply and the droop coefficient are aggregated according to the capacity, as shown in equations (18)-(19); The fraction of total power generated by the high press turbine $F_H$ and reheat time constant $T_R$ are aggregated according to the capacity and the reserve capacity, as shown in equations (20)-(23); the aggregation method of the inertia time constant H is the same as the equation (1).

$$\Delta P_{max} = \sum_{g=1}^{n} (\Delta P_{maxg} S_g) / \sum_{g=1}^{n} S_g \tag{18}$$

$$\frac{1}{R} = \sum_{g=1}^{n} (S_g / R_g) / \sum_{g=1}^{n} S_g \tag{19}$$

$$\kappa_g = K_{mg} \Delta P_{maxg} \tag{20}$$

$$\gamma_g = \kappa_g / \sum_{g=1}^{n} \kappa_g \tag{21}$$

$$F_H = \sum_{g=1}^{n} \gamma_g F_{Hg} \tag{22}$$

$$T_R = \sum_{g=1}^{n} \gamma_g T_{Rg} \tag{23}$$

Where: $\kappa$, $\gamma$ are intermediate variables.

Figure 7:
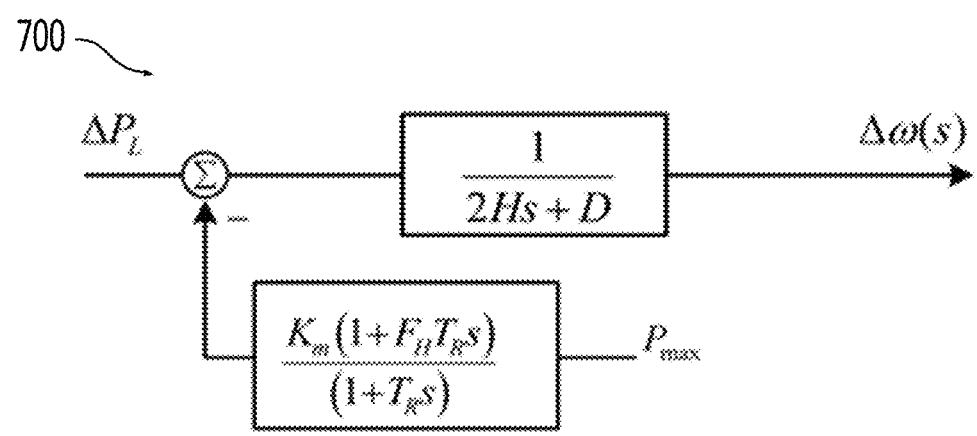
FIG. 7 shows a diagram of a frequency response s-domain model of a system saturated stage II according to an embodiment of the present disclosure.

Considering the inertia link of the equivalent governor, when the valve opening enters into the saturation II section, its active adjustment has not yet reached the limit, and vice versa, when the equivalent governor active adjustment reaches the limit, the valve opening must be in the saturation II section. If the system frequency reaches to the extreme point after the disturbance, the equivalent governor valve opening is still in the linear I section, it does not meet the configuration of a PFR reserve procurement economy principle, therefore, the system frequency reaches to the extreme point after the disturbance, the equivalent governor valve opening must be in the saturation II section. At this point, the system frequency dynamic s-domain model can be represented by FIG. 7. FIG. 7 shows a diagram 700 of a frequency response s-domain model of a system saturated stage II according to an embodiment of the present disclosure.

Further, based on the diagram 700 in FIG. 7, the system frequency dynamic s-domain expression can be as in equation (24).

Where:

$$\Delta \omega(s) = \frac{\Delta P_L - K_m P_{max}}{Ds(s^2 + 2\xi_1 \omega_{n1} s + \omega_{n1}^2)} + \frac{\Delta \omega_0 (2\xi_1 \omega_{n1} + s) + \Delta \omega_0'}{s^2 + 2\xi_1 \omega_{n1} s + \omega_{n1}^2} \tag{24}$$

$$\omega_{n1}^2 = \frac{D}{2HT_R} \tag{25}$$

$$\xi_1 = \left(\frac{DT_R + 2H}{2D}\right) \omega_{n1} \tag{26}$$

The first term of the equation (24) is the superposition of the non-zero initial state input of the transfer function with the transfer function; the second term of the equation (24) is the non-zero initial state output of the saturation II segment transfer function with the non-zero initial state value output parameter.

Transforming the equation (24) to the time domain, an analytical time domain model of the system frequency dynamics can be obtained as follows:

Where:

$$\Delta \omega(t) = \tag{27}$$

$$\left(\frac{\Delta P_L - K_m P_{max}}{D}\right)(1 - A_3 e^{\omega_1 t} - A_4 e^{\omega_2 t}) + \Delta \omega(0)(A_5 e^{\omega_1 t} + A_6 e^{\omega_2 t})$$

$$A_3 = \frac{\sqrt{\xi_1^2 - 1} + \xi_1 - k_1 \omega_{n1}}{\sqrt{\xi_1^2 - 1}} \tag{28}$$

$$A_4 = \frac{\sqrt{\xi_1^2 - 1} - \xi_1 + k_1 \omega_{n1}}{\sqrt{\xi_1^2 - 1}} \tag{29}$$

$$A_5 = \frac{\sqrt{\xi_1^2 - 1} + \xi_1}{2\sqrt{\xi_1^2 - 1}} \tag{30}$$

$$A_6 = \frac{\sqrt{\xi_1^2 - 1} - \xi_1}{2\sqrt{\xi_1^2 - 1}} \tag{31}$$

$$k_1 = \frac{2HT_R \Delta \omega_0'}{\Delta P_L - K_m \Delta P_{max}} \tag{32}$$

Further, according to the first-order optimality condition of the equation (27), the time domain expression of the frequency extremum can be obtained as follows:

Where:

$$\Delta \omega_n = \left(\frac{\Delta P_L - K_m P_{max}}{D}\right)(1 - A_3 e^{\omega_1 t_n} - A + \Delta \omega(0)(A_5 e^{\omega_1 t_n} + A_6 e^{\omega_2 t_n}) \tag{33}$$

$$t_n = \frac{1}{\omega_1 - \omega_2} \ln \frac{-\omega_2 (\Delta \omega_0 A_6 - k_2 A_4)}{\omega_1 (\Delta \omega_0 A_5 - k_2 A_3)} \tag{34}$$

$$k_2 = \left(\frac{\Delta P_L - K_m P_{max}}{2HT_R \omega_{n1}^2}\right) \tag{35}$$

It should be noted that the time domain dynamics of the system frequency characterized by the equation (27) is derived on the basis of the analytical model of the system frequency dynamics considering multiple damping states, and therefore, it is applicable to both under-damped and over-damped states.

It is not difficult to find that under the condition of known disturbance, the system frequency extremum is related to the inertia time constant of the equivalent generator, the equivalent governor limit value and the droop coefficient, etc. The equation (33) provides a theoretical basis for the PFR reserve procurement.

III. Renewable Energy Power System Primary Frequency Regulation Reserve Procurement A. Hyperplane Based Frequency Stability Constrained Approximation Method In order to ensure that the dynamic extreme value point of the system frequency after the disturbance does not cross the boundary of maintaining the system frequency stability, i.e., it does not trigger the low-frequency load shedding or high-frequency cut-off, combined with the time domain analytic formula for the extreme value point of the system frequency after the disturbance derived in the previous section considering the multiple damping states and the limiting link, the following constraint can be added to the PFR reserve procurement.

$$\omega_{max} \geq \left(\frac{\Delta P_L - K_m \Delta P_{max}}{D}\right)(1 - A_3 e^{\omega_1 t_n} - A_4 e^{\omega_2 t_n}) \geq \quad (36)$$
$$\omega_{min} + \Delta\omega(0)(A_5 e^{\omega_1 t_n} + A_6 e^{\omega_2 t_n}) + \omega_0$$

Where: $\omega_{max}$ and $\omega_{min}$ are the frequency extremes of the system after the disturbance.

From the formula (36), it can be seen that the relationship between the limiting link of the PFR governor and the frequency extremum point is nonlinear, and it will bring a large computational burden if the PFR reserve procurement model is added directly. For this reason, the present disclosure discloses herein a hyperplane based frequency stability constraint approximation method specifically as follows:

$$\omega_{max} \geq a_i 1/R + b_i F_H \Delta P_{max} + c_i \Delta P_{max} + d_i \geq \omega_{min}, \forall i \in v \quad (37)$$

Where: v is the number of hyperplanes, $a_i$, $b_i$, $c_i$ and $d_i$ is the coefficient of hyperplane.

Figure 8:
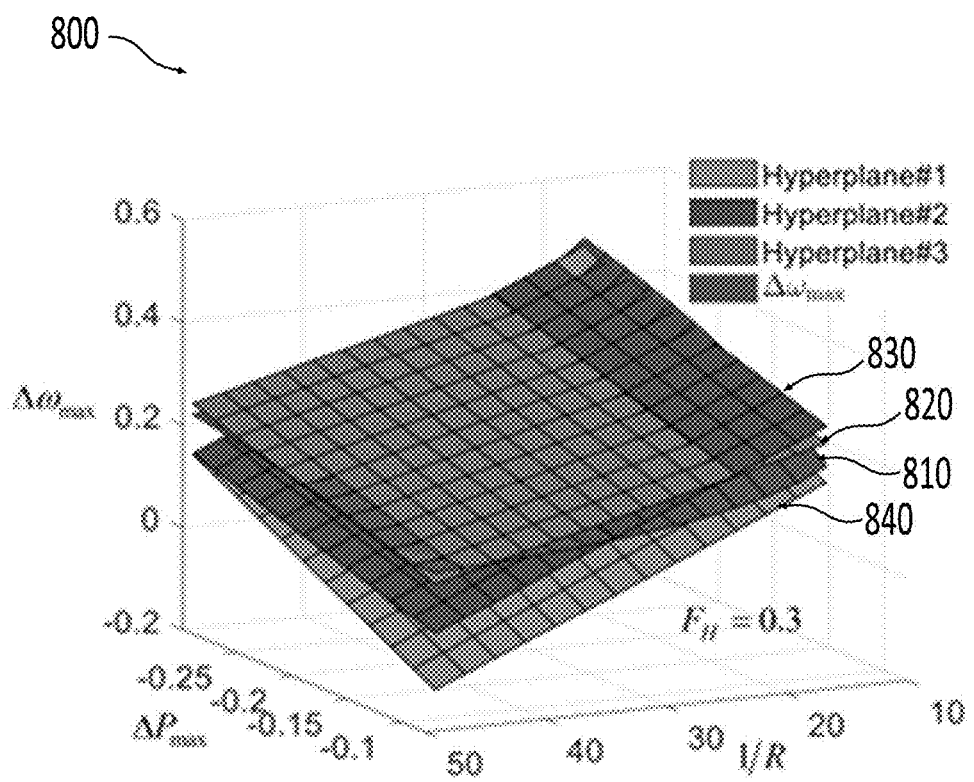
FIG. 8 shows a diagram of hyperplane based frequency stability constrained approximation method according to an embodiment of the present disclosure.

FIG. 8 shows a diagram 800 of a hyperplane based frequency stability constrained approximation method according to an embodiment of the present disclosure. The analytical mapping relationship between the frequency extrema and the key PFR parameters can be characterized by a hyperplane, as shown in the diagram 800 in FIG. 8, where the surface 810 is the frequency extrema calculated by the equation (33), and the surface 820, surface 830, and surface 840 are the hyperplanes calculated by the equation (33).

The objective of the hyperplane approximation substitution method is to minimize the sum of the errors between the hyperplane and the theoretical calculated values for all evaluation points as follows:

$$\min \sum_j \left(\max_{1 \leq i \leq v}\{a_i R_j + b_i F_{Hj} \Delta P_{maxj} + c_i P_{maxj} + d_i\} - \omega_n(R_j, F_{Hj}, P_{maxj})\right)^2 \quad (38)$$

The first term in the formula (38) is the maximum value of the hyperplane calculated from the evaluation points, and the second term is the frequency extrema solved by the equation (33). It is easy to see that v hyperplanes need to be solved for v−1 times the maximum value, therefore, the present disclosure discloses herein a linearization method as shown in formulas (39) to (43):

$$\max_{1 \leq i \leq v}\{a_i R_j + b_i F_{Hj} + c_i P_{maxj} + d_i\} = J_{v-1}, \forall j \quad (39)$$

$$F_i = a_i R_j + b_i F_{Hj} + c_i P_{maxj} + d_i, \forall j \in v \quad (40)$$

$$F_i \leq I_1 \leq F_1 + n_1 M, \forall j \in v \quad (41)$$

$$F_i \leq I_{i-1} \leq F_i + (1 - n_{i-1})M, \forall j \in v, 2 \leq i \leq v \quad (42)$$

$$I_{i-1} \leq I_i \leq I_{i-1} + n_i M, \forall j \in v, 2 \leq i \leq v-1 \quad (43)$$

Where M is a very large number, n is a binary variable.

B. Primary Frequency Regulation Reserve Procurement Optimization Model

The objective of the primary frequency regulation reserve optimization model is to minimize the sum of generation cost and standby adjustment cost, as follows:

$$\min \sum_{t=1}^{T} \sum_{g=1}^{N_G} \left(C_g^{Da} P_{g,t}^G x_{g,t}^G + C_g^{Res}(\Delta P_{maxg,t}^{G,up} + \Delta P_{maxg,t}^{G,down})\right) \quad (44)$$

Where: T is the period of grid dispatch, N is the total number of generators, $C_g^1$, $C_g^2$ are the generation and reserve capacity costs, $P_{g,t}^{PG}$, $\Delta P_{maxg,t}^{G,up}$, $\Delta_{maxg,t}^{PG,down}$ are the generator output, the up-regulated and down-regulated reserve capacity. It should be noted that the governor limiter $\Delta P_{max}$ of the present disclosure is the specific value of $\Delta P_{maxg,t}^{G,up}$ and $\Delta P_{maxg,t}^{G,down}$ in the frequency dynamics of this subsection.

The steady-state operation constraints of the power system include: nodal active balance constraints, i.e., equation (45); nodal phase angle constraints, line capacity constraints, and tidal constraints, i.e., formulas (46)-(48); active output constraints and upward and downward reserve capacity constraints for conventional power, wind power, and photovoltaic units, i.e., formulas (49)-(56); and conventional power creep constraints, i.e., formulas (57)-(59).

$$\sum_{g \in S_n^G} P_{g,t}^G + \sum_{w \in S_n^W} P_{w,t}^W + \sum_{pv \in S_n^{PV}} P_{pv,t}^{PV} - \sum_{l \in S_n^{LS}} F_{l,t}^L + \sum_{l \in S_n^{LE}} F_{l,t}^L = D_{n,t}, \quad (45)$$

$$\forall n, \forall t$$

$$-\pi \leq \theta_{n,t} \leq \pi, \forall n, \forall t \quad (46)$$

$$F_{l,t}^L = B_l^L(\theta_{l(+),t} - \theta_{l(-),t}), \forall l, \forall t \quad (47)$$

$$-F_l^{L,Max} \leq F_{l,t}^L \leq F_l^{L,Max}, \forall l, \forall t \quad (48)$$

$$x_{g,t}^G P_g^{G,Min} \leq P_{g,t}^G \leq P_g^{G,Max} x_{g,t}^G, \forall g, \forall t \quad (49)$$

$$0 \leq \Delta P_{maxg,t}^{up} \leq x_{g,t}^G P_g^{G,Max} - P_{g,t}^G, \forall g, \forall t \quad (50)$$

$$0 \leq \Delta P_{maxg,t}^{down} \leq x_{g,t}^G P_g^G - P_g^{G,Min}, \forall g, \forall t \quad (51)$$

$$0 \leq P_{w,t}^W \leq x_{w,t} P_{w,t}^{W,Max}, \forall w, \forall t \quad (52)$$

$$0 \leq \Delta P_{maxw,t}^{up} \leq x_{w,t} P_w^{W,Max} - P_{w,t}^w, \forall w, \forall t \quad (53)$$

$$0 \leq \Delta P_{maxw,t}^{down} \leq x_{w,t} P_{w,t}^W - P_w^{G,Min}, \forall w, \forall t \quad (54)$$

$$0 \leq P_{pv,t}^{PV} \leq x_{pv,t} P_{pv,t}^{PV,Max}, \forall pv, \forall t \quad (55)$$

$$0 \leq \Delta P_{maxpv,t}^{up} \leq x_{pv,t} P_{pv}^{PV,Max} - P_{pv,t}^{PV}, \forall pv, \forall t \quad (56)$$

$$0 \leq \Delta P_{maxpv,t}^{down} \leq x_{pv,t} P_{pv,t}^{PV} - P_{pv}^{PV,Min}, \forall pv, \forall t \quad (57)$$

$$P_{g,t}^G - P_{g,t-1}^G \leq \alpha_{g,t}^{G,UP}, \forall g, \forall t \quad (58)$$

$$P_{g,t-1}^G - P_{g,t}^G \leq \alpha_{g,t}^{G,DN}, \forall g, \forall t \quad (59)$$

Where: $P_{g,t}^G$, $P_{w,t}^W$, $P_{pv,t}^{PV}$ is the benchmark active output of conventional power, wind power, photovoltaic units; $P_g^{G,Max}$, $P_w^{W,Max}$, $P_{pv}^{PV,Max}$ is the capacity of conventional power, wind power, photovoltaic units; $x_{g,t}$, $x_{w,t}$, $x_{pv,t}$ is the unit commitment of conventional power, wind power, photovoltaic; $F_{l,t}^L$, $B_l^L$ is the line tide and electric power; $D_{n,t}$, $\theta_{n,t}$ for the node load and phase angle; $\alpha_{g,t}^{G,UP}$, $\alpha_{g,t}^{G,DN}$ for the upward and downward climbing limits of conventional power. It should be noted that this model does not consider the uncertainty of renewable energy output.

In addition, to guarantee the frequency stability of the power system in extreme disturbance scenarios, the frequency extremum point constraint is added, i.e., the formula (36), where the key PFR parameters are aggregated according to the equations (18)-(23).

IV. Example Analysis

A. Introduction to Simulation Examples

Figure 9:
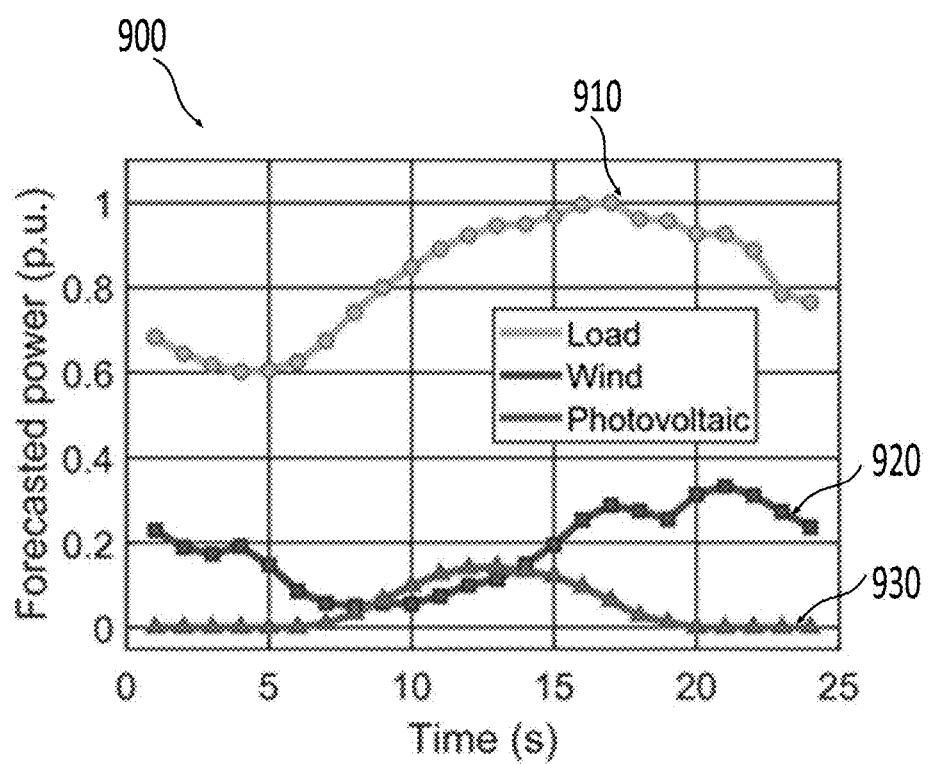
FIG. 9 shows a diagram of forecasted load demand, wind power and photovoltaic outputs according to an embodiment of the present disclosure.

A modified IEEE 39 node test system is used to verify the effectiveness of the disclosed method. Specifically, wind farms with a capacity of 500 MW are connected at nodes 14, 16, 18 and 28, and photovoltaic plants with a capacity of 500 MW are connected at nodes 1 and 5, respectively. The steady state operation and frequency regulation parameters of synchronous generators, wind farms and photovoltaic plants are shown in Table 1 and Table 2 respectively, and the primary frequency regulation backup cost of the units is set as twice the generation cost. In the present disclosure, the optimal adjustment problem of primary frequency regulation backup capacity is studied, with a time period of 24 hours and a decision variable time resolution of 1 hour. The upper and lower bounds of frequency stability are set to 50.5 Hz and 49.5 Hz respectively, and the disturbances are described in the same way as in existing technologies in the optimization problem of operation mode considering the frequency stability constraint, and the type of disturbance is set to be a sudden change of active load with the magnitude of 10% of the maximum load. FIG. 9 shows a diagram 900 of forecasted load demand 910, wind power 920 and photovoltaic outputs 930 according to an embodiment of the present disclosure. The load and scenic generation prediction curves are shown in the diagram 900 in FIG. 9, and the effects of load and scenic generation prediction errors are not considered here.

TABLE 1

Steady-state parameters of power source

| Generator number | Access Nodes | Capacity (MW) | Minimum output (MW) | Upper climb (MW/h) | downhill climbing (MW/h) | Power Generation Costs (¥/MWh) |
|---|---|---|---|---|---|---|
| 1 | 39 | 300 | 100 | 100 | 100 | 25 |
| 2 | 31 | 630 | 100 | 300 | 300 | 16 |
| 3 | 32 | 750 | 100 | 300 | 300 | 23 |
| 4 | 33 | 740 | 100 | 300 | 300 | 17 |
| 5 | 34 | 620 | 100 | 300 | 300 | 16 |
| 6 | 35 | 720 | 100 | 300 | 300 | 15 |
| 7 | 36 | 650 | 100 | 300 | 300 | 23 |
| 8 | 37 | 600 | 100 | 300 | 300 | 24 |
| 9 | 38 | 1000 | 100 | 300 | 300 | 26 |
| 10 | 30 | 1160 | 100 | 300 | 300 | 25 |
| 11 | 1 | 500 | \ | \ | \ | 10 |
| 12 | 5 | 500 | \ | \ | \ | 10 |
| 13 | 14 | 500 | \ | \ | \ | 10 |
| 14 | 16 | 500 | \ | \ | \ | 10 |
| 15 | 18 | 500 | \ | \ | \ | 10 |
| 16 | 21 | 500 | \ | \ | \ | 10 |

TABLE 2

Power source frequency modulation parameters

| Generator number | Inertia (s) | droop coefficient | fraction of total power generated by the high press turbine | reheat time constant (s) |
|---|---|---|---|---|
| 1 | 4.78 | 0.04 | 0.25 | 6 |
| 2 | 4.81 | 0.05 | 0.3 | 8 |
| 3 | 4.77 | 0.04 | 0.3 | 8 |
| 4 | 3.86 | 0.05 | 0.3 | 8 |
| 5 | 4.19 | 0.05 | 0.3 | 8 |
| 6 | 4.83 | 0.06 | 0.2 | 8 |
| 7 | 4.06 | 0.04 | 0.3 | 8 |
| 8 | 4.05 | 0.04 | 0.3 | 8 |
| 9 | 3.45 | 0.03 | 0.35 | 10 |
| 10 | 4.31 | 0.03 | 0.35 | 10 |
| 11 | 2.00 | 0.02 | 0 | 8 |
| 12 | 2.00 | 0.02 | 0 | 8 |
| 13 | 2.00 | 0.02 | 0 | 8 |
| 14 | 2.00 | 0.02 | 0 | 8 |
| 15 | 2.00 | 0.02 | 0 | 8 |
| 16 | 2.00 | 0.02 | 0 | 8 |

B. Validity of the Frequency Dynamic Analysis Model of the Disclosed System

1) Considering Frequency Dynamic Multi-Damping States

To facilitate the description, the models involved in the analysis of this subsection are summarized and introduced as follows.

(1) Model-Simulink-I: simulation model based on the IEEE-39 node simulation system built on the Matlab-Simulink platform, with a classical second-order model for synchronous power supply and VSM control for renewable energy power supply. The simulation step size is 0.001 s. The system frequency dynamics after the Model-Simulink-I perturbation is treated as the true value in the later analysis.

(2) Classical SFR analytical model: all synchronous power supplies and new energy power supplies in the IEEE-39 node simulation system are aggregated into one equivalent machine, and the aggregation method is shown in the equations (1)-(5), while the equation (9) is used as the frequency dynamic time domain curve.

(3) Multi-damping state SFR analytical model: the model disclosed in section 1.1 of the present disclosure, i.e., the equation (13).

Figure 10:
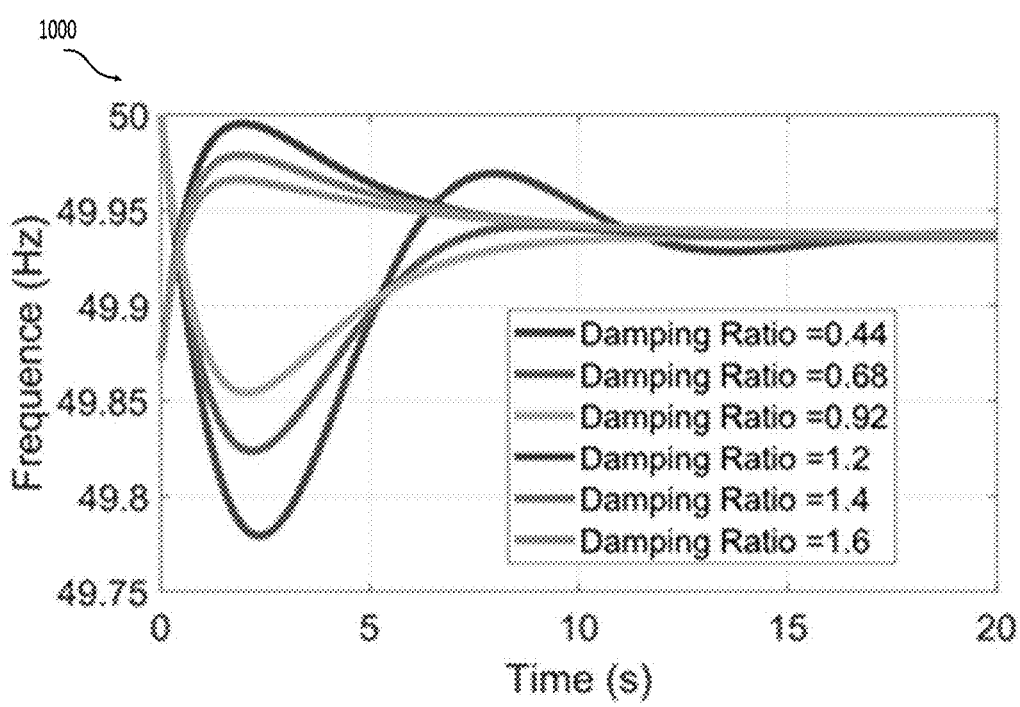
FIG. 10 shows a diagram of a classical system frequency response (SFR) model frequency dynamics according to an embodiment of the present disclosure.
Figure 11:
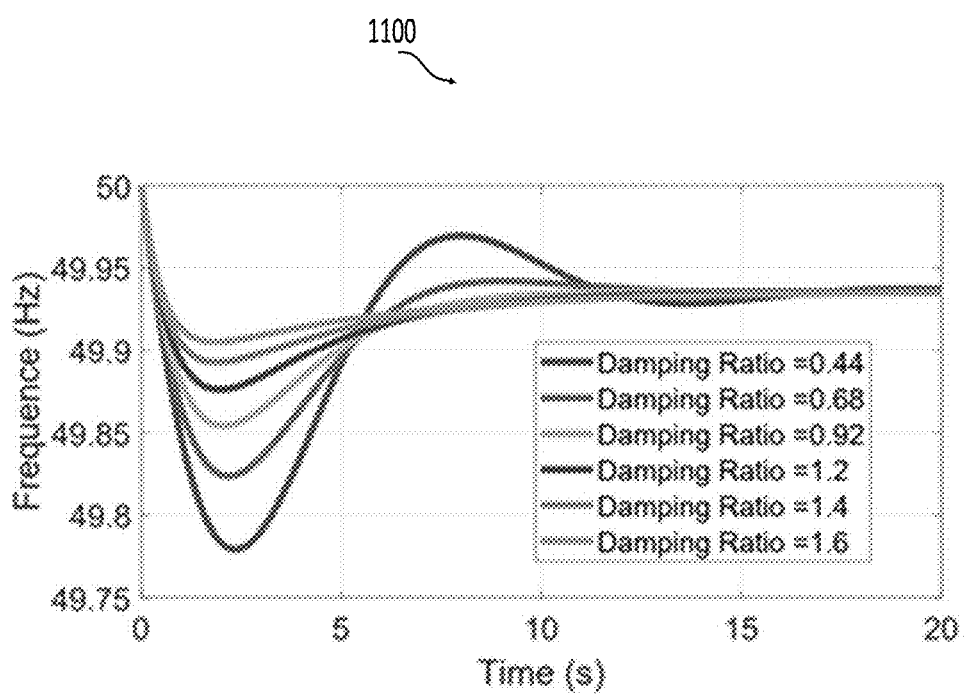
FIG. 11 shows a diagram of multi-damped state-SFR model frequency dynamics according to an embodiment of the present disclosure.

Six groups of damping ratio values are set, including three groups of under-damped states, 0.44, 0.65 and 0.86, and three groups of over-damped states, 1.1, 1.3 and 1.5. The comparison of the accuracy of the classical SFR and the multi-damped state SFR model disclosed in the present disclosure for the inscription of the frequency nadir under low frequency disturbance is shown in Table 3. As can be seen from Table 3, the classical SFR model and the multi-damped SFR model disclosed in the present disclosure have no computational error on the frequency minimum in the under-damped state. The classical SFR model has a larger error in the over-damped state, and its relative errors on the frequency minimum are 92.56%, 77.69%, and 74.78% when the damping ratio is 1.1, 1.3, and 1.5 respectively, and whereas, the computational error on the frequency minimum of the multi-damped SFR model disclosed in the present disclosure is still 0. The main reason is that in the over-damped state, the classical SFR model is missing a negative sign in the derivation of the analytical formula for the frequency extreme. FIG. 10 shows a diagram 1000 of a classical system frequency response (SFR) model frequency dynamics according to an embodiment of the present disclosure. FIG. 11 shows a diagram 1100 of multi-damped state-SFR model frequency dynamics according to an embodiment of the present disclosure. The post disturbance frequency dynamics of the two models with six sets of damping ratio parameters are shown in the diagram 1000 in FIG. 10 and the diagram 1100 in FIG. 11, respectively. From the diagram 1000 in FIG. 10, the post disturbance frequency dynamics of the classical SFR model in the under-damped state is consistent with the actual engineering experience, while in the over-damped state, the frequency dynamics is not consistent with the actual engineering experience; from the diagram 1100 in FIG. 11, it can be seen that the disclosed multi-damped SFR model can be applied to the post-disturbance frequency dynamics of the over-damped and under-damped states. The frequency dynamics of the disclosed multi-damped SFR model is applicable to the calculation of the frequency nadir after the disturbance in the over-damped and under-damped states.

TABLE 3

Comparison of frequency nadir resolution accuracy under low frequency disturbance

| damping | classical SFR | | multi-damped SFR | |
|---|---|---|---|---|
| ratio | frequency nadir Hz | error % | frequency nadir Hz | error % |
| 0.44 | 49.748 | 0 | 49.748 | 0 |
| 0.65 | 49.795 | 0 | 49.795 | 0 |
| 0.86 | 49.828 | 0 | 49.828 | 0 |
| 1.10 | 49.989 | 92.56 | 49.852 | 0 |
| 1.30 | 49.971 | 77.69 | 49.870 | 0 |
| 1.50 | 49.971 | 74.78 | 49.885 | 0 |

2) Considering the Governor Limiting Link

Similarly, the models involved in the analysis of this subsection are summarized and presented as follows.

(1) Model-Simulink-II: simulation model based on the IEEE-39 node simulation system built on the Matlab-Simulink platform, with a classical second-order model for the synchronous power supply and VSM control for renewable energy power supply. The dead zone and limiting link of each power supply governor are considered, while the dead zone size is set to 0.15 Hz and the limiting value is ±9.23% of Installed capacity. The simulation step is 0.001 s. The system frequency dynamics after the Model-Simulink-II perturbation is treated as the true value in the later analysis.

(2) Multi-damped state SFR: Analytical model, same as the section 3.2.1.

(3) Improved SFR-I: analytical model, based on the multi-damped state SFR model disclosed in the section 1.1 of the present disclosure. The dead zone of governor is considered, which is set to 0.15 Hz.

(4) Improved SFR-II: analytical model, based on the multi-damped state SFR model disclosed in the section 1.1 of the present disclosure, considering both the dead zone and the limiting link of the governor, with the dead zone set to 0.15 Hz and the limiting value of ±9.23% of the installed capacity.

(5) SFR considering the limiting link: the analytical model which disclosed in the section 1.2 of the present disclosure, i.e., the equation (27), with a limiting value of ±9.23% of installed capacity.

The comparison of the accuracy of the above four types of analytical models for frequency nadir inscription under low frequency perturbation is shown in Table 4. As can be seen from Table 4, the resolution error of the frequency minimum of the improved SFR-II model is 0, which is consistent with the Model-Simulink-II model; the resolution error of the frequency minimum of the SFR model considering the limiting link is 1.6%, and the impact of the dead zone on the frequency minimum under large disturbances is not significant. It is noted that the dead zone in the simulation model is 0.15 Hz, which is much larger than the current national standard for synchronous power supply and new energy power supply (which is around ±0.033 Hz and ±0.05 Hz respectively.) If the dead zone is set according to the national standard, its influence on the resolution accuracy of frequency minimum under large disturbance will be further reduced, which shows the reasonableness of ignoring the dead zone link. The resolution accuracy of frequency minimum is similar between the improved SFR-I and multi-damped SFR models, while the multi-damped SFR model has the lowest accuracy. On the one hand, it shows that the dead zone has little influence on the resolution accuracy of frequency nadir under large perturbation, and on the other hand, it reflects the limitation of SFR model.

TABLE 4

Comparison of the largest frequency deviation resolution accuracy under low frequency disturbance

| | Maximum deviation of frequency | |
|---|---|---|
| model | value(Hz) | error (%) |
| Multi-damping state SFR | 0.358 | 42.72 |
| Improved SFR-I | 0.365 | 41.60 |
| Improved SFR-II | 0.615 | 1.60 |
| Model-Simulink-II | 0.625 | \ |

C. Primary Frequency Regulation Reserve Procurement Considering Frequency Stability Constraint In order to reflect the impact of the disclosed method of resolving the system frequency extremum after disturbance on the primary frequency regulation reserve procurement, two control groups are set up.

(1) Control group-I: Without considering the frequency stability constraint, 10% of the maximum load is forced to reserve for the power supply participating in frequency regulation at each time period, as a primary frequency regulation reserve.

(2) Control group-II: Considering the frequency stability constraint and the governor limiting link on the basis of the classical SFR model, but forcing the governor valve opening of each power supply to be in the linear segment.

1) Economic Index of Primary Frequency Regulation Reserve Procurement

Figure 12:
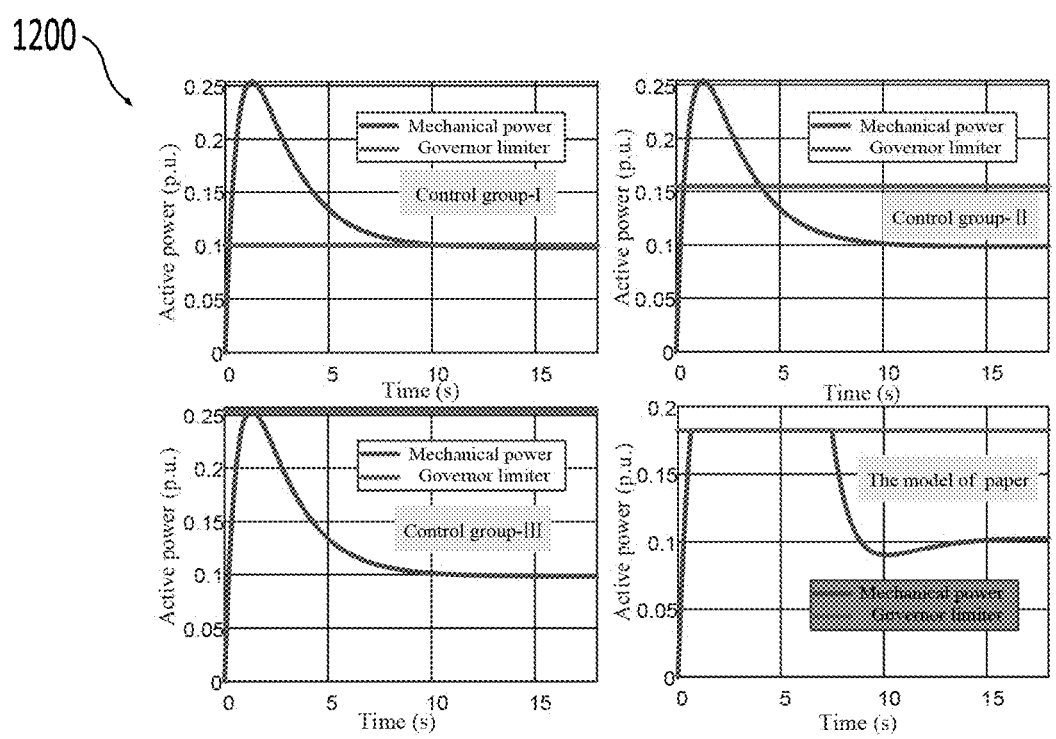
FIG. 12 shows a diagram of the governor output power curves of four models according to an embodiment of the present disclosure.
Figure 13:
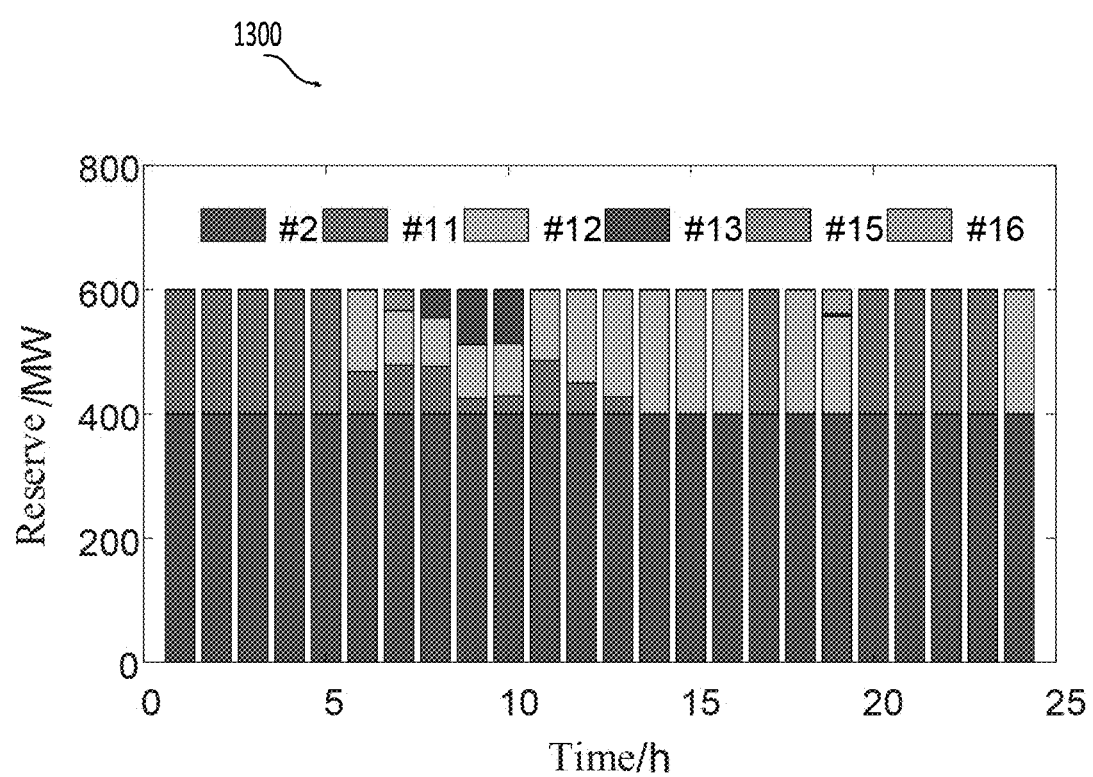
FIG. 13 shows a diagram of the frequency nadir curves for the four models according to an embodiment of the present disclosure.
Figure 14:
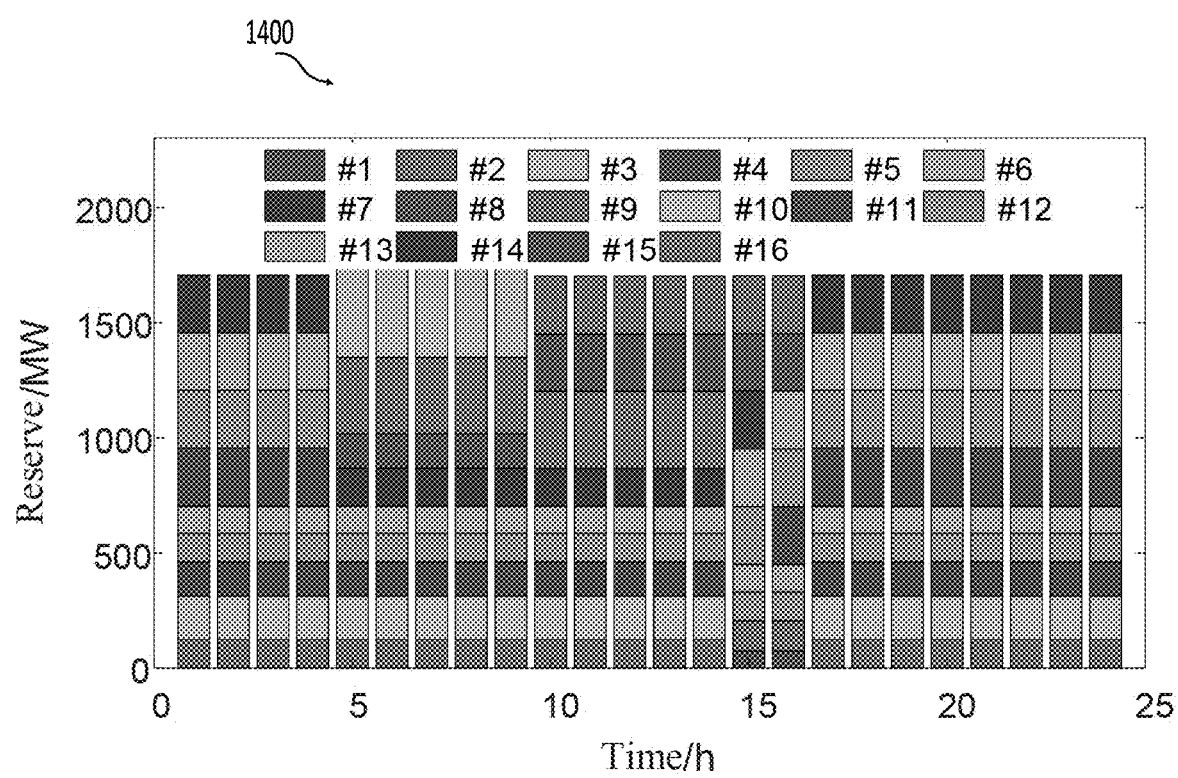
FIG. 14 shows a diagram of the frequency nadir curves for the four models according to an embodiment of the present disclosure.

FIG. 12 shows a diagram 1200 of the governor output power curves of four models according to an embodiment of the present disclosure. FIG. 13 shows a diagram 1300 of the frequency nadir curves for the four models according to an embodiment of the present disclosure. FIG. 14 shows a diagram 1400 of the frequency nadir curves for the four models according to an embodiment of the present disclosure. The results of the primary frequency regulation reserve procurement of the renewable energy power system based on the above-mentioned types of models are shown in FIGS. 12-14, and the operating costs of the renewable energy power system are shown in Table 5. As can be seen from Table 5, the generation cost of the three models is relatively close, while the difference in operating cost is large, mainly due to the difference in primary frequency regulation reserve cost.

(1) Control group-I: The primary frequency regulation reserve cost is the lowest. This model apportions the primary frequency regulation reserve to each power source in the on state. Although the cost factor is taken into account when regulating the reserve, the frequency reserve is mainly assigned to #2, #11 and #12 units with lower reserve cost, as shown in the diagram 1300 FIG. 13. However, the adequacy of the regulation reserve is not verified, i.e. the stability of the system frequency under the condition of large disturbance cannot be ensured, so the reference significance of the primary frequency reserve cost is not significant.

(2) Control group-II: The primary frequency reserve cost is the highest. This model considers the frequency stability constraint, and the power supply governor limiting link is considered, but requires the governor to work in a linear state. For this reason, frequency reserve left by each power supply is larger, as shown in FIG. 13, resulting in poor economics of the primary frequency regulation reserve results. The primary frequency reserve cost of the control group-II increased by 213.42% compared to the control group-I, and the total operating cost increased by 38.17%.

TABLE 5

Operation costs comparison of different models

| Model | Power generation cost | Primary frequency reserve cost | Operation cost |
|---|---|---|---|
| Control group-I | 1550191 | 262607 | 1812798 |
| Control group-II | 1517700 | 964184 | 2481884 |
| This paper | 1550315 | 721352 | 2271667 |

(3) The model of the present disclosure: The model takes the frequency stability constraint and the limiting link of each power supply governor into account, through the linear-saturation state aggregation method of the governor disclosed in the present disclosure. The condition of each power governor working in the linear state is eliminated, and the optimal regulation of the primary frequency reserve capacity is achieved, as shown in FIG. 14. Compared with the control group-I, the primary frequency reserve cost increased by 134.64% and the total operating cost increased by 24.25%.

2) Calibration of System Frequency Stability Under Large Disturbance Conditions

Figure 15:
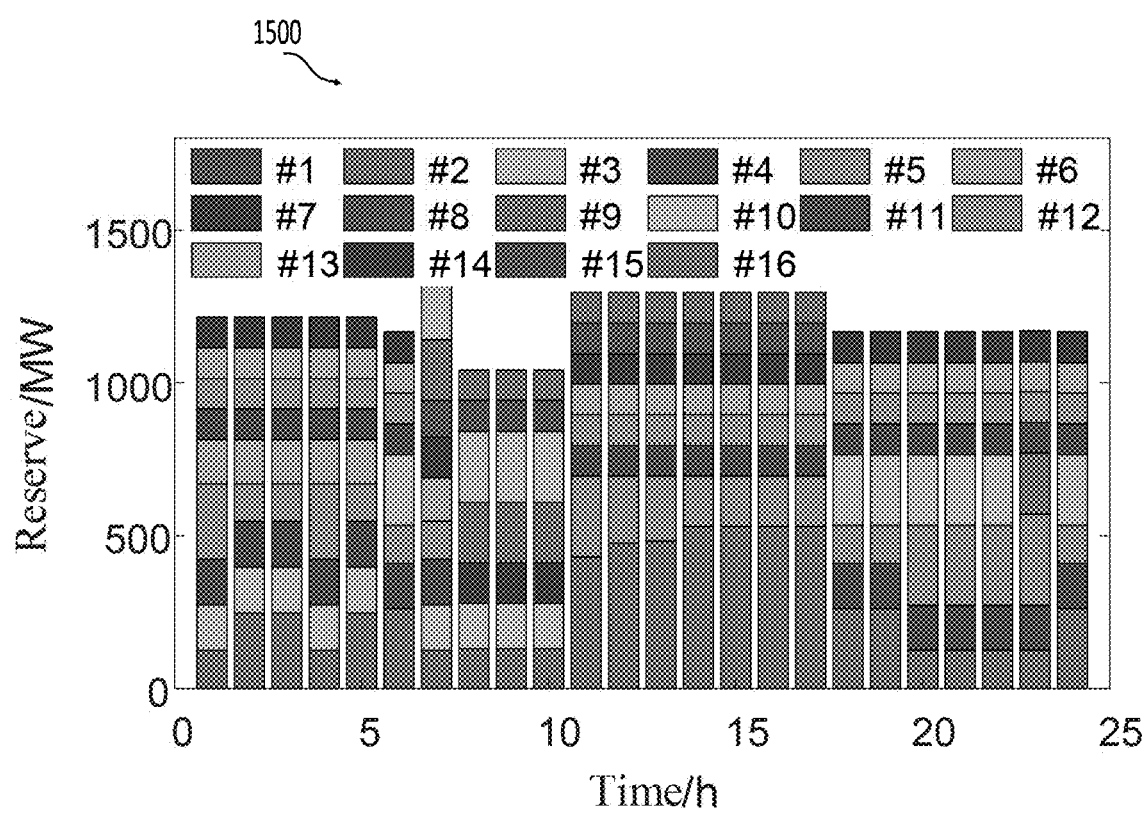
FIG. 15 shows a diagram of the frequency nadir curves for the four models according to an embodiment of the present disclosure.

First, observe the relationship between the active power change of the governor and the governor limiting link under the large disturbance condition in time period 1 for the three types of models, as shown in FIG. 15. FIG. 15 shows a diagram 1500 of the frequency nadir curves for the four models according to an embodiment of the present disclosure. It is not difficult to find that the equivalent governor active power increase exceeds the active power limit value corresponding to the governor limit link because the control group-I model does not consider the governor limit link. Control group-II model considers the limit link, and the equivalent governor active power increase has been in the below of the governor limit link corresponding to the active power limit value, but requires the governor to work in a linear state, resulting in a conservative result of the primary frequency regulation reserve procurement. In this model, the equivalent governor active power increase does not exceed the regulation reserve procurement value, reflecting the effectiveness of the limiting link. At the same time, considering the governor active power adjustment is slower than the valve opening changes (the inertial response links exist), the regulated reserve procurement capacity is low conservatism.

Figure 16:
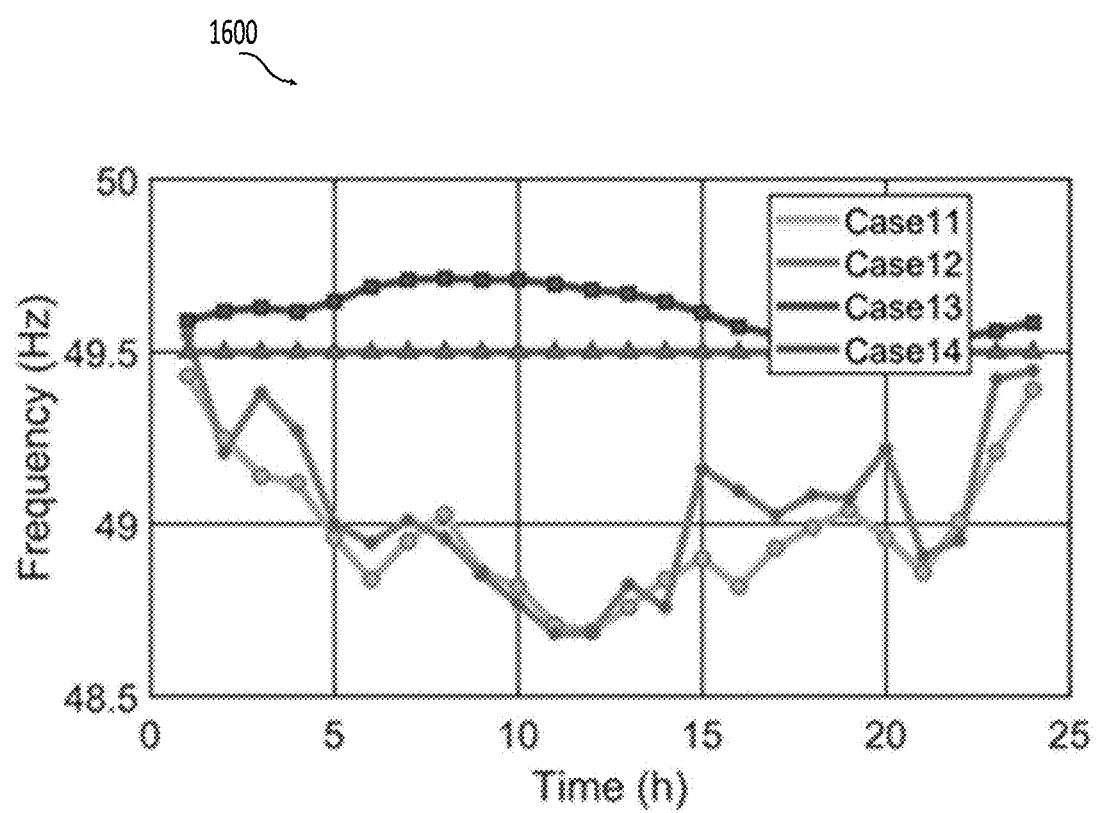
FIG. 16 shows a diagram of the frequency extreme under extreme low-frequency disturbance conditions according to an embodiment of the present disclosure.

FIG. 16 shows a diagram 1600 of the frequency extreme under extreme low-frequency disturbance conditions according to an embodiment of the present disclosure. The primary frequency regulation reserve procurement results of the three types of models are substituted into the Model-Simulink-II model to simulate the frequency extreme under extreme low-frequency disturbance conditions, as shown in FIG. 16. It should be noted that the horizontal coordinates of FIG. 16 are the sequential number of scheduling periods, not the dynamic evolution time of the system frequency after the disturbance. From FIG. 16, it can be seen that although the primary frequency regulation reserve cost of control group-I is low, its reserve regulation strategy cannot guarantee that the system frequency extremes meet the frequency stability constraint under extreme large disturbance conditions in most of the scheduling periods. In control group-II, the frequency nadir of each scheduling period is higher than the frequency stability requirement, which reflects the conservative nature of its reserve regulation strategy; while the frequency nadir of this model is under extreme disturbance conditions. In the control group-II, the frequency nadir of each scheduling period is higher than the frequency stability requirement, reflecting the conservativeness of its reserve regulation strategy; while the frequency nadir of the model in the present disclosure under the extreme disturbance condition exactly meets the frequency stability constraint, reflecting the economy of the reserve regulation result.

V. Conclusion

The present disclosure discloses a primary frequency regulation reserve procurement method of renewable energy power systems considering the system frequency dynamic multi-damped state and governor limiting link. The main conclusions are as follows.

(1) As the proportion of renewable energy power supply participating in frequency regulation continues to rise, the system frequency dynamics after disturbance may change from under-damped state to over-damped state. The multi-damped state SFR model disclosed in the present disclosure is applicable to both over-damped and under-damped state of system frequency dynamics after disturbance.

(2) The present disclosure discloses a SFR model considering the limiting link of the governor, and then discloses a bipartite time domain analysis method for the post-disturbance frequency dynamics, which establishes the analytical relationship between the primary frequency reserve of each power supply and the post-disturbance frequency extreme of the system, and reduces the conservativeness of the primary frequency reserve procurement method.

(3) For the strong nonlinear term in the post-disturbance system frequency extreme point constraint, a hyperplane based approximation method is disclosed to transform the nonlinear frequency constraint into a set of linear inequality constraints, which reduces the solution cost of the primary frequency regulation reserve procurement model.

The present disclosure considers the influence of the power governor limiting link (i.e., the primary frequency reserve) on the frequency extreme point of the system after the disturbance. The present disclosure can also be modified to consider the influence of the conventional power-on mode, renewable energy output uncertainty, and also lacks the characterization of the spatial distribution of the frequency after the disturbance, which will be obvious to persons skilled in the art.

By using the PFR reserve procurement, the renewable energy power system can avoid the frequency nadir crossing the frequency stability boundary in extreme operating conditions. Compared to the existing work, the condition for each power supply governor to work in the linear state is eliminated, and the optimal adjustment of the PFR reserve procurement is realized, which reduces the operating cost of the system.

VI. Technical Implementation of the Disclosed Method

Figure 17:
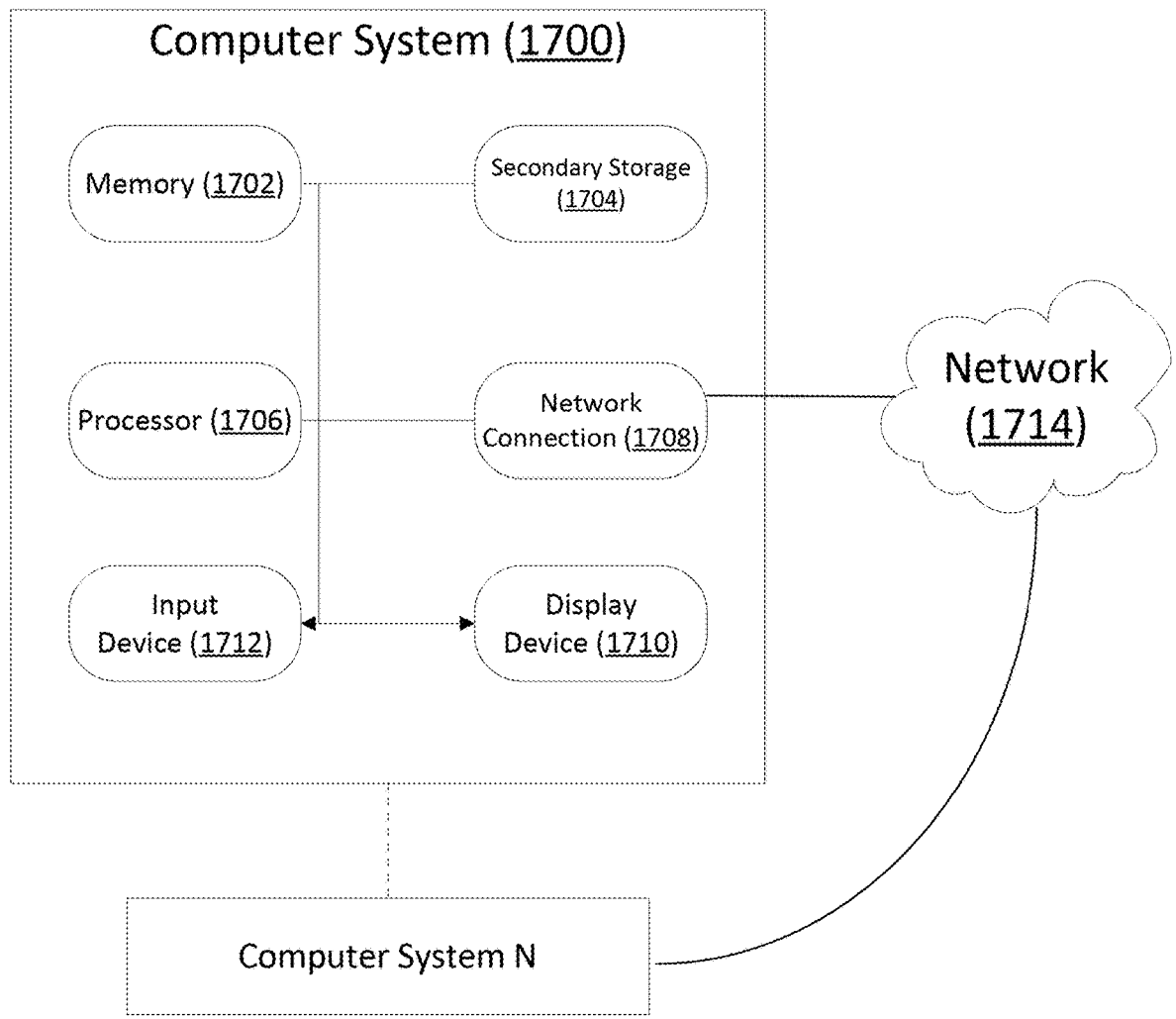
FIG. 17 shows illustrates an exemplary computer system that can be used to implement the disclosed method partially or wholly, according to an embodiment of the present disclosure.

In some embodiments, the system disclosed herein may comprise a computer system to implement the disclosed method. FIG. 17 illustrates an exemplary computer system 1700 that can be used to implement the disclosed method partially or wholly. The computer system 1700, or other computer systems similarly configured, may include and execute one or more subsystem components to perform functions described herein, including the steps/blocks of various processes, measurements and/or analyses described above. Likewise, a mobile device, a cell phone, a smartphone, a laptop, a desktop, a notebook, a tablet, a wearable device, a server, etc., which includes some of the same components of the computer system 1700, may run an application (or software) and perform the steps and functionalities described above. The computer system 1700 may connect to a network 1714, e.g., Internet, or other network, to receive inquiries, obtain data, and/or transmit information as described above.

The computer system 1700 typically includes a memory 1702, a secondary storage device 1704, and a processor 1706. The computer system 1700 may also include a plurality of processors 1706 and be configured as a plurality of, e.g., bladed servers, or other known server configurations. The computer system 1700 may also include a network connection device 1708, a display device 1710, and an input device 1712.

The memory 1702 may include RAM or similar types of memory, and it may store one or more applications for execution by the processor 1706. The secondary storage device 1704 may include a hard disk drive, floppy disk drive, CD-ROM drive, or other types of non-volatile data storage. The processor 1706 executes the application(s), such as those described herein, which are stored in the memory 1702 or secondary storage 1704, or received from the Internet or other network 1714. The processing by processor 1706 may be implemented in software, such as software modules, for execution by computers or other machines. These applications preferably include instructions executable to perform the system and subsystem component functions and methods described above and illustrated in the Figs. herein. The applications preferably provide graphical user interfaces (GUIs) through which users may view and interact with the subsystem components.

The computer system 1700 may store one or more database structures in the secondary storage 1704, for example, for storing and maintaining the information/data necessary to perform the above-described functions. Alternatively, such information/data may be in storage devices separate from these components.

Also, as noted, the processor 1706 may execute one or more software applications to provide the functions described in this specification, specifically to execute and perform the steps and functions in the process flows, measurements and/or analyses described above. The GUIs may be formatted, for example, as web pages in HyperText Markup Language (HTML), Extensible Markup Language (XML) or in any other suitable form for presentation on a display device depending upon applications used by users to interact with the computer system 1700.

The input device 1712 may include any device for entering information into the computer system 1700, such as a touch-screen, keyboard, mouse, cursor-control device, microphone, digital camera, video recorder or camcorder. The input and output device 1712 may be used to enter information into GUIs during performance of the methods described above. The display device 1710 may include any type of device for presenting visual information such as, for example, a computer monitor or flat-screen display (or mobile device screen). The display device 1710 may display the GUIs and/or output from sub-system components (or software).

Examples of the computer system 1700 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1700 is shown in detail, the computer system 1700 may use multiple computer systems or servers as necessary or desired to support the users and may also use back-up or redundant servers to prevent network downtime in the event of a failure of a particular server. In addition, although the computer system 1700 is depicted with various components, one skilled in the art will appreciate that the computer system 1700 can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1700, to perform a particular method, such as methods described above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method for primary frequency regulation (PFR) reserve procurement of a renewable energy power system, wherein the renewable energy power system includes synchronous power sources and renewable energy sources, and the renewable energy sources participate in frequency regulation using virtual synchronous machine (VSM) control, the method comprising:

aggregating generators in the synchronous power sources and the renewable energy sources into an equivalent unit having an equivalent governor, wherein a governor limiter $\Delta P_{max}$ and a primary frequency modulation gain $1/R$ of the equivalent governor are determined as $$\Delta P_{max} = \sum_{g=1}^{n}(\Delta P_{maxg}S_g) \bigg/ \sum_{g=1}^{n}S_g \quad (18)$$

wherein:
g represents an index of generator in the renewable energy power system, $K_{mg}=S_g/S_{sys}$, $K_{mg}$ is a standardized parameter of a unit normalized to a system capacity, S g is a capacity of the generator in the renewable energy power system;

based on the equivalent unit, determining system frequency dynamics of the renewable energy power system in s-domain ($\Delta\omega(s)$), as where $$\Delta\omega(s) = \frac{\Delta P_L - K_m P_{max}}{D_S(s^2 + 2\xi_1\omega_{n1}s + \omega_{n1}^2)} + \frac{\Delta\omega_0(2\xi_1\omega_{n1}+s) + \Delta\omega_0}{s^2 + 2\xi_1\omega_{n1}s + \omega_{n1}^2} \quad (24)$$

$$\omega_{n1}^2 = \frac{D}{2HT_R} \quad (25)$$

$$\xi_1 = \left(\frac{DT_R + 2H}{2D}\right)\omega_{n1} \quad (26)$$

where:
$\Delta\omega(s)$ is a system frequency deviation in Laplace-domain, $\Delta P_L$ is an active power disturbance, $K_m$ is an equivalent $K_{mg}$ of an equivalent unit aggregated generators in synchronous power sources and renewable energy sources, $P_{max}$ is a power limitation of an equivalent governor, D is electrical load demands of the equivalent governor, s is an operator in Laplace-domain, $\xi_1$ is a damping ratio, $\omega_{n1}$ is a natural frequency, $\Delta\omega_0$ is frequency deviation values for non-zero initial states in Laplace-domain;

transforming the equation (24) to a time-domain equation for the system frequency dynamics of the renewable energy power system in both over-damped and under-damped states ($\Delta\omega(t)$), as $$\Delta\omega(t) = \quad (27)$$
$$\left(\frac{\Delta P_L - K_m P_{max}}{D}\right)(1 - A_3 e^{\omega_1 t} - A_4 e^{\omega_2 t}) + \Delta\omega(0)(A_5 e^{\omega_1 t} + A_6 e^{\omega_2 t})$$

-continued $$A_3 = \frac{\sqrt{\xi_1^2 - 1} + \xi_1 - k_1\omega_{n1}}{\sqrt{\xi_1^2 - 1}} \quad (28)$$

$$\omega_1 = \omega_n\left(-\xi + \sqrt{\xi^2 - 1}\right) \quad (14)$$

$$\omega_2 = \omega_n\left(-\xi - \sqrt{\xi^2 - 1}\right) \quad (15)$$

$$A_5 = \frac{\sqrt{\xi_1^2 - 1} + \xi_1}{2\sqrt{\xi_1^2 - 1}} \quad (30)$$

$$A_6 = \frac{\sqrt{\xi_1^2 - 1} - \xi_1}{2\sqrt{\xi_1^2 - 1}} \quad (31)$$

wherein $\Delta\omega(t)$ is the frequency deviation in time-domain, $\Delta P_L$ is the active power disturbance, $K_m$ is the equivalent $K_{mg}$ of the equivalent unit aggregated generators in the synchronous power sources and the renewable energy sources, $P_{max}$ is the governor limiter of the equivalent governor, $\omega_1$, $\omega_2$ are a damping frequency, $\Delta\omega(0)$ is a frequency deviation value for non-zero initial state in time-domain, $A_3$, $A_4$, $A_5$, $A_6$ are coefficients of exponential functions;

wherein a time domain dynamics of the system frequency characterized by the equation (27) is derived on the basis of an analytical model of the system frequency dynamics considering multiple damping states, which is applicable to both under-damped and over-damped states;

according to a first-order optimality condition of the equation (27), determining a time domain expression of frequency extremum, as $$\Delta\omega_n = \left(\frac{\Delta P_L - K_m P_{max}}{D}\right)(1 - A_3 e^{\omega} + \Delta\omega(0)(A_5 e^{\omega_1 t_n} + A_6 e^{\omega_2 t}) \quad (33)$$

wherein $\Delta\omega(t)$ is the frequency deviation of the renewable energy power system in time-domain, $\Delta P_L$ is the active power disturbance of the renewable energy power system, $K_m$ is the equivalent $K_{mg}$ of the equivalent unit aggregated generators in the synchronous power sources and the renewable energy sources, $P_{max}$ is the governor limiter of the equivalent governor, $\omega_1$, $\omega_2$ are the damping frequency, $\Delta\omega(0)$ is the frequency deviation values for non-zero initial states in time-domain, $A_3$, $A_4$, $A_5$, $A_6$ are the coefficient values of exponential functions;

Stabilizing a system frequency of the renewable energy power system by adding a hyperplane based frequency stability constraint, as $$\omega_{max} \geq a_i\frac{1}{R} + b_i F_H \Delta P_{max} + c_i \Delta P_{max} + d_i \geq \omega_{min}, \forall i \in v \quad (37)$$

wherein the: $\omega_{max}$ and $\omega_{min}$ are frequency extrema of the renewable energy power system after a disturbance occurs to the renewable energy power system, and are determined by the equation (33); $1/R$ is a primary frequency modulation gain of the equivalent governor, and is determined by the equation (19); $F_H$ is the high-pressure cylinder power ratio of the equivalent governor; $a_j$, $b_j$, $c_j$, $d_j$ are hyperplane coefficients, and are determined by the equation (38);

$$\min \sum_j \left( \max_{1 \le i \le v} \{a_i/R_j + b_i F_{Hj} \Delta P_{max\,j} + c_i \Delta P_{max\,j} + d_i\} - \omega_n(R_j, F_{Hj}, \Delta P_{max\,j}) \right)^2, \forall j \in v \quad (38)$$

wherein v is a number of hyperplanes; $\omega_n$ is a natural frequency;

determining the PFR reserve procurement of the renewable energy power system through $$\min \sum_{t=1}^{T} \sum_{g=1}^{N_G} \left( C_g^{Da} P_{g,t}^G x_{g,t}^G + C_g^{Res} \left( \Delta P_{maxg,t}^{G,up} + \Delta P_{maxg,t}^{G,down} \right) \right) \quad (44)$$

wherein T is a dispatch period of a power system, $N_G$ is a total number of generators, g is the generator in the renewable energy power system, $C_g^{Da}$ is generation costs of power sources, $P_{g,t}^G$ is a generator output, $x_{g,t}^G$ is a unit status of power sources, $C_g^{Res}$ is reserve capacity costs of power sources, $\Delta P_{maxg,t}^{G,up}$, $\Delta P_{maxg,t}^{G,down}$ are an up-regulated and a down-regulated reserve capacity; wherein the governor limiter $\Delta P_{max}$ is a specific value of $\Delta P_{maxg,t}^{G,up}$ and $\Delta P_{maxg,t}^{G,down}$; and reducing an operating cost of the renewable energy power system, based on the PFR reserve procurement; and controlling the generators in the synchronous power sources and renewable energy sources based on the procured capacities of the generators according to the PFR reserve procurement to stabilize the renewable energy power system in response to frequency disturbances;

wherein a time-domain expression of the system frequency dynamics after a disturbance applicable to multiple damping states is derived from:

where:

$$\Delta \omega(t) = \frac{R \Delta P_L}{K_m + RD}(1 - A_1 e^{\omega_1 t} - A_2 e^{\omega_2 t}) \quad (13)$$

$$\omega_1 = \omega_n \left( -\xi + \sqrt{\xi^2 - 1} \right) \quad (14)$$

$$\omega_2 = \omega_n \left( -\xi - \sqrt{\xi^2 - 1} \right) \quad (15)$$

$$A_1 = \frac{\sqrt{\xi^2 - 1} + \xi - T_R \omega_n}{\sqrt{\xi^2 - 1}} \quad (16)$$

$$A_2 = \frac{\sqrt{\xi^2 - 1} - \xi + T_R \omega_n}{\sqrt{\xi^2 - 1}} \quad (17)$$

wherein an order of each power governor into a limit is deduced according to a limit value and a regulation rate, and further by a method of segmental analysis and response superposition to obtain a system frequency dynamics analytical formula after a disturbance.

\* \* \* \* \*